United States Patent
Moriwaki

(10) Patent No.: US 8,531,432 B2
(45) Date of Patent: Sep. 10, 2013

(54) TOUCH PANEL WITH BUILT-IN DISPLAY DEVICE

(75) Inventor: Hiroyuki Moriwaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 190 days.

(21) Appl. No.: 13/145,167

(22) PCT Filed: Aug. 31, 2009

(86) PCT No.: PCT/JP2009/065213
§ 371 (c)(1),
(2), (4) Date: Jul. 19, 2011

(87) PCT Pub. No.: WO2010/095293
PCT Pub. Date: Aug. 26, 2010

(65) Prior Publication Data
US 2011/0273401 A1    Nov. 10, 2011

(30) Foreign Application Priority Data
Feb. 18, 2009  (JP) ................. 2009-034822

(51) Int. Cl.
*G06F 3/045* (2006.01)

(52) U.S. Cl.
USPC .................. 345/174; 345/173; 200/512

(58) Field of Classification Search
None
See application file for complete search history.

(56) References Cited

U.S. PATENT DOCUMENTS

| | | | |
|---|---|---|---|
| 8,243,027 B2 * | 8/2012 | Hotelling et al. | 345/173 |
| 2007/0070047 A1 | 3/2007 | Jeon et al. | |
| 2007/0182719 A1 | 8/2007 | Lee et al. | |
| 2007/0194320 A1 | 8/2007 | Cho et al. | |
| 2008/0055502 A1 | 3/2008 | Wu et al. | |
| 2008/0129898 A1 | 6/2008 | Moon | |
| 2008/0192001 A1 | 8/2008 | Choi et al. | |
| 2008/0278451 A1 * | 11/2008 | Lee | 345/173 |
| 2010/0013789 A1 * | 1/2010 | Chung et al. | 345/174 |
| 2011/0291977 A1 * | 12/2011 | Moriwaki | 345/173 |

FOREIGN PATENT DOCUMENTS

| | | |
|---|---|---|
| JP | 2000-99268 A | 4/2000 |
| JP | 2007-95044 A | 4/2007 |
| JP | 2007-200336 A | 8/2007 |
| JP | 2007-220123 A | 8/2007 |
| JP | 2008-65302 A | 3/2008 |
| JP | 2007-122913 A | 5/2008 |
| JP | 2008-198180 A | 8/2008 |

* cited by examiner

Primary Examiner — Lixi C Simpson
(74) Attorney, Agent, or Firm — Birch, Stewart, Kolasch & Birch, LLP

(57) ABSTRACT

A touch panel with a built-in display device has No. 1 sensor lines (120) and No. 2 sensor lines (150), which are both formed by a third conductive film and extend in horizontal and vertical directions, respectively. Therefore, the No. 1 sensor lines (120) are configured by single uninterrupted conductors so as to prevent short-circuit where the No. 1 sensor lines (120) cross the No. 2 sensor lines (150). The No. 2 sensor lines (150) are configured by pairs of conductors (151, 152) separated by spaces (SP), so as to sandwich the No. 1 sensor lines (120) therebetween. In addition, pad portions (370) are provided above the spaces (SP), so as to electrically connect the pairs of conductors (151, 152) of the No. 2 sensor lines (150). In this manner, the touch panel with a built-in display device is provided capable of preventing short-circuit of wiring conductors formed in the same layer, thereby increasing the degree of freedom in wiring layout.

8 Claims, 15 Drawing Sheets

FIG. 15
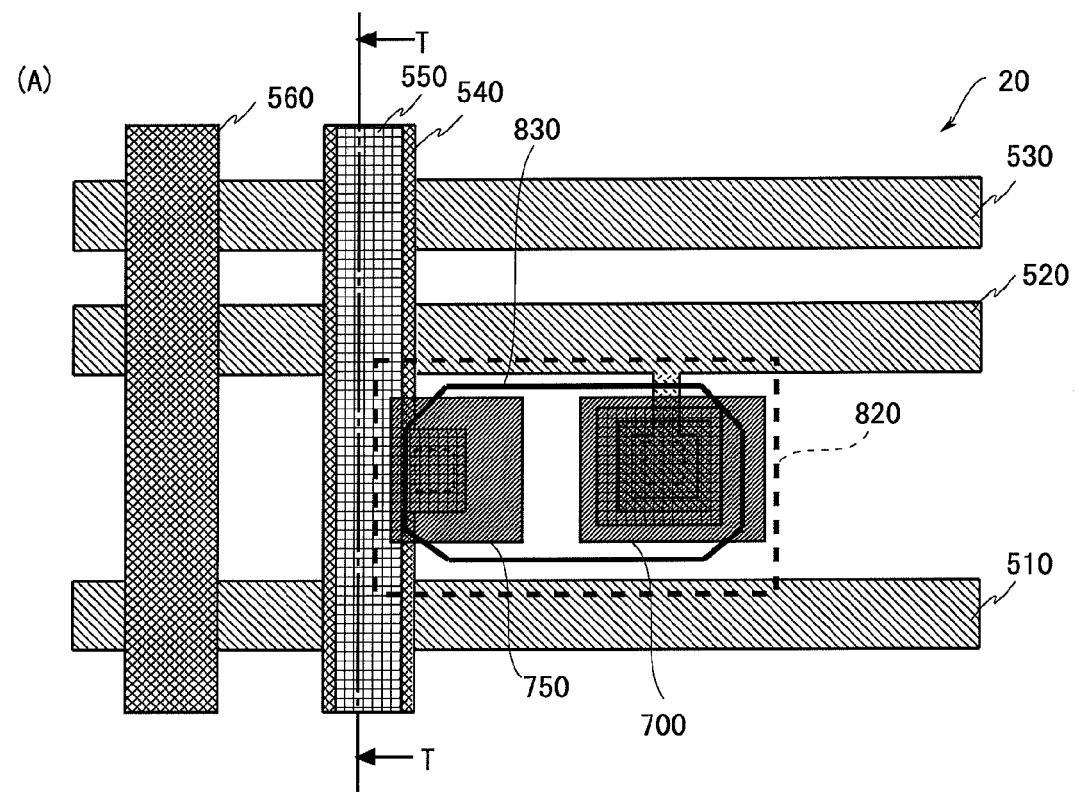
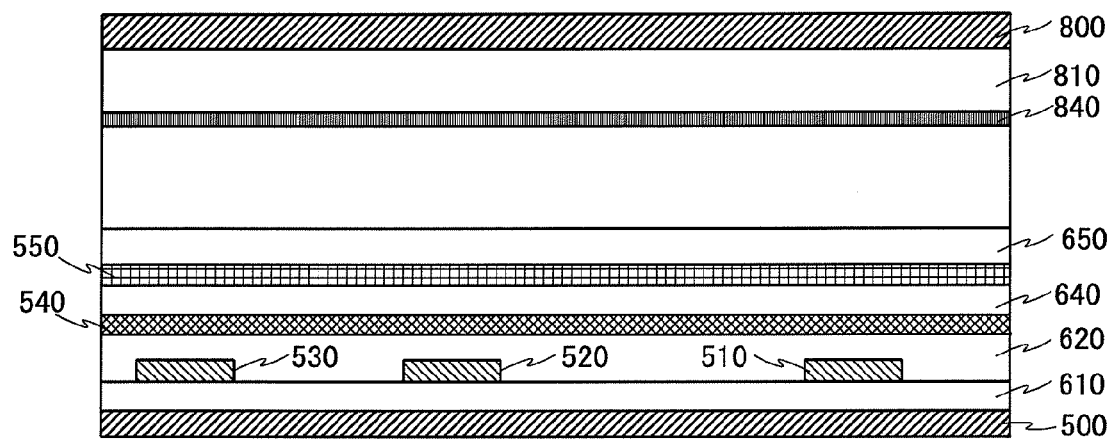

TOUCH PANEL WITH BUILT-IN DISPLAY DEVICE

TECHNICAL FIELD

The present invention relates to touch panels with built-in display devices, and more particularly to a touch panel with a built-in display device in which pressed positions on the panel are identified based on voltage changes on sensor lines.

BACKGROUND ART

In recent years, electronic appliances which require menu selections have been increasingly provided with touch panels which are pressed with a pen or a finger to make a desired menu selection in accordance with a screen display. Such electronic appliances employ various methods for identifying pressed positions on the panel.

Patent Document 1 discloses a touch panel with a built-in liquid crystal display device in which pressed positions are identified by obtaining potential differences between sensor lines and dummy lines, both of which are provided in the touch panel with a built-in liquid crystal display device. FIG. 14 provides (A) a plan view partially illustrating a display element portion of the conventional touch panel with a built-in liquid crystal display device disclosed in Patent Document 1, and (B) a cross-sectional view illustrating the display element portion in cross-section taken along line S-S shown in (A).

Referring to FIG. 14, the operation of the touch panel with a built-in liquid crystal display device for identifying a pressed position will be outlined. In the touch panel with a built-in liquid crystal display device, a TFT (thin-film transistor) substrate, which includes a glass substrate 500 on which display element portions 19 and a driver circuit (not shown) are formed, is disposed so as to be opposed to a CF (color filter) substrate, which includes a glass substrate 800 on which color filters, a common electrode, and so on, are formed. On the glass substrate 500, a plurality of data lines 540 made of a conductive film are formed so as to cross a plurality of gate lines 510 made of a conductive film different from that of the data lines 540. Furthermore, sets of sensor lines 550 and dummy lines 560 are formed, one set for each data line 540, so as to be parallel to the data lines 540 in the same layer, and sets of sensor lines 520 and dummy lines 530 are formed, one set for each gate line 510, so as to be parallel to the gate lines 510 in the same layer. Note that reference characters 610, 620, and 640 denote interlayer insulating films.

In such a touch panel with a built-in liquid crystal display device, when the surface of the CF substrate is pressed, the common electrode 840, which is formed on the surfaces of sensor spacers 830 provided on the glass substrate 800, makes contact with conductive pads 700 and 750, which are respectively connected to the sensor lines 520 and 550, so that a common voltage being provided to the common electrode 840 is provided to each of the sensor lines 520 and 550 via the conductive pads 700 and 750, respectively. On the other hand, the dummy lines 530 and 560 are provided with a reference voltage. Therefore, the touch panel with a built-in liquid crystal display device can compare the common voltage provided to the sensor lines 520 and 550 with the reference voltage provided to the dummy lines 530 and 560 to identify the pressed position on the CF substrate.

PRIOR ART DOCUMENT

Patent Document

[Patent Document 1] Japanese Laid-Open Patent Publication No. 2008-122913

SUMMARY OF THE INVENTION

Problem to be Solved by the Invention

However, in the case of the touch panel with a built-in liquid crystal display device described in Patent Document 1, not only the gate lines 510 and the data lines 540 but also the sensor lines 520 and 550 and the dummy lines 530 and 560 are provided on the TFT substrate, which causes a problem of a reduced aperture ratio of the display element portions 19.

FIG. 15 provides (A) a plan view illustrating an exemplary configuration for preventing reduction in the aperture ratio of a display element portion in a touch panel with a built-in liquid crystal display device, as proposed by the present inventors in their earlier application (Japanese Patent Application No. 2009-13822), and (B) a cross-sectional view illustrating the display element portion in cross-section taken along line T-T shown in (A). As shown in FIG. 15, the sensor lines 550 are formed above the data lines 540, thereby making it possible to prevent reduction in the aperture ratio of the display element portions 20. However, to achieve such a configuration, it is necessary to form the gate lines 510, the sensor lines 520, and the dummy lines 530 by a first-layer conductive film (first conductive film), the data lines 540 and the dummy lines 560 by a second-layer conductive film (second conductive film), and the sensor lines 550 by a third-layer conductive film (third conductive film). In this manner, the display element portions 20 require one more conductive film compared to the display element portions 19 as shown in FIG. 14. In this case, there is a problem in that forming additional wiring conductors, such as conductive pads 700 and 750, further increases the number of necessary conductive film layers, which reduces the degree of freedom in wiring layout. Accordingly, if it is possible to prevent short-circuit of wiring conductors formed in the same layer, more wiring conductors can be formed by the same conductive film. Note that in FIG. 15, reference characters 610, 620, 640, and 650 denote interlayer insulating films.

Therefore, an objective of the present invention is to provide a touch panel with a built-in display device capable of preventing short-circuit of wiring conductors formed in the same layer, thereby increasing the degree of freedom in wiring layout.

Solution to the Problems

A first aspect of the present invention is directed to a touch panel with a built-in display device having a first insulating substrate and a second insulating substrate positioned so as to be opposed to each other and identifying a pressed position based on a predetermined voltage provided when a surface of the second insulating substrate is pressed, the panel comprising:

a plurality of gate lines and a plurality of No. 1 sensor lines formed on the first insulating substrate so as to extend in a first direction;

a plurality of data lines and a plurality of No. 2 sensor lines formed on the first insulating substrate so as to extend in a second direction crossing the first direction;

a plurality of display element portions provided in their respective areas where the gate lines cross the data lines;

press electrodes formed on the second insulating substrate for providing the predetermined voltage to the No. 1 and No. 2 sensor lines; and a position identification circuit for, when the surface of the second insulating substrate is pressed, identifying the pressed position based on the predetermined voltage provided to each of the No. 1 and No. 2 sensor lines connected to the display element portion that corresponds to the pressed position, wherein, the No. 1 and No. 2 sensor lines are configured by conductors formed in the same layer, the conductors configuring either one group of the No. 1 and No. 2 sensor lines are separated by first spaces, the one group of the sensor lines sandwiches the other group of the sensor lines in the first spaces and includes first connectors above the first spaces for electrically connecting the conductors separated by the first spaces, and when the surface of the second insulating substrate is pressed, any of the first connectors makes contact with the press electrode to provide the predetermined voltage to each of the conductors separated by the first space.

In a second aspect of the present invention, based on the first aspect of the invention, further comprised are a plurality of No. 1 dummy lines and a plurality of No. 2 dummy lines formed on the first insulating substrate, the No. 1 and No. 2 dummy lines having a reference voltage applied thereto and extending in the first direction and the second direction, respectively, the position identification circuit includes a comparison and identification circuit for, when the surface of the second insulating substrate is pressed, comparing the predetermined voltage provided to each of the No. 1 and No. 2 sensor lines to the reference voltage, thereby identifying the pressed position, either the No. 1 or No. 2 dummy lines extend in the same direction as at least the other group of the sensor lines and are configured by conductors formed in the same layer as the No. 1 and No. 2 sensor lines, and the one group of the sensor lines further sandwiches the dummy lines extending in the same direction as the other group of the sensor lines in the first spaces.

In a third aspect of the present invention, based on the first aspect of the invention, further comprised are a plurality of No. 1 dummy lines and a plurality of No. 2 dummy lines formed on the first insulating substrate, the No. 1 and No. 2 dummy lines having a reference voltage applied thereto and extending in the first direction and the second direction, respectively, the position identification circuit includes a comparison and identification circuit for, when the surface of the second insulating substrate is pressed, comparing the predetermined voltage provided to each of the No. 1 and No. 2 sensor lines to the reference voltage, thereby identifying the pressed position, either the No. 1 or No. 2 dummy lines extend in the same direction as at least the one group of the sensor lines and are configured by conductors formed in the same layer as the No. 1 and No. 2 sensor lines, the conductors configuring the dummy lines extending in the same direction as the one group of the sensor lines are separated by second spaces, and the dummy lines extending in the same direction as the one group of the sensor lines sandwich the other group of the sensor lines in the second spaces and include second connectors above the second spaces for electrically connecting the conductors separated by the second spaces.

In a fourth aspect of the present invention, based on the third aspect of the invention, the one group of the sensor lines and the dummy lines extending in the same direction as the one group of the sensor lines further sandwich the dummy lines extending in the same direction as the other group of the sensor lines in the first spaces and the second spaces, respectively.

In a fifth aspect of the present invention, based on any of the first through fourth aspects of the invention, the display element portions each further include: a first sensor electrode electrically connected to and provided above the No. 1 sensor line; and a second sensor electrode electrically connected to and provided above the No. 2 sensor line, the press electrodes are each opposed to the first sensor electrode and the second sensor electrode at a predetermined distance, and make contact with the first and second sensor electrodes to provide the predetermined voltage to both the No. 1 sensor line and the No. 2 sensor line, and either the first sensor electrode or the second sensor electrode includes the first connector.

Effect of the Invention

According to the first aspect of the present invention, the conductors configuring either one group of the No. 1 and No. 2 sensor lines are separated by first spaces, so as to sandwich the other group of the sensor lines in the first spaces. Consequently, it is possible to prevent short-circuit of the No. 1 sensor lines and the No. 2 sensor lines even when they are configured by conductors formed in the same layer. Thus, it is possible to increase the degree of freedom in wiring layout. Moreover, first connectors are provided above the first spaces, thereby making it possible to electrically connect the separated conductors of the sensor lines provided with the first spaces. Furthermore, when the surface of the second insulating substrate is pressed, the press electrode makes contact with the first connector, thereby providing the predetermined voltage to each of the separated conductors of the sensor line.

According to the second aspect of the present invention, the one group of the sensor lines sandwiches the conductors configuring the other group of the sensor lines in the first spaces, along with the conductors configuring the dummy lines extending in the same direction as them. Consequently, it is possible to prevent short-circuit not only of the No. 1 sensor lines and the No. 2 sensor lines but also of either the No. 1 or the No. 2 dummy lines extending in the same direction as at least the other group of the sensor lines, even when they are configured by conductors formed in the same layer as the No. 1 and No. 2 sensor lines. Thus, it is possible to increase the degree of freedom in wiring layout. Moreover, second connectors are provided above the second spaces, thereby making it possible to electrically connect the separated conductors of the dummy lines provided with the second spaces.

According to the third aspect of the present invention, the conductors configuring the other group of the sensor lines are sandwiched in the first spaces of the one group of the sensor lines and the second spaces of the dummy lines extending in the same direction as them. Consequently, it is possible to prevent short-circuit not only of the No. 1 sensor lines and the No. 2 sensor lines but also of either the No. 1 or No. 2 dummy lines extending in the same direction as at least the one group of the sensor lines, even when they are configured by conductors formed in the same layer as the No. 1 and No. 2 sensor lines. Thus, it is possible to increase the degree of freedom in wiring layout. Moreover, second connectors are provided above the second spaces, thereby making it possible to electrically connect the separated conductors of the dummy lines provided with the second spaces.

According to the fourth aspect of the present invention, conductors of the one group of the sensor lines and conductors of the dummy lines extending in the same direction as them are separated by the first spaces and the second spaces, respectively, and conductors of the other group of the sensor lines and the dummy lines extending in the same direction as them are sandwiched by the first spaces and the second spaces. Consequently, it is possible to prevent short-circuit of the No. 1 sensor lines, the No. 2 sensor lines, the No. 1 dummy lines, and the No. 2 dummy lines, even when they are configured by conductors formed in the same layer. Thus, it is possible to increase the degree of freedom in wiring layout.

According to the fifth aspect of the present invention, when the surface of the second insulating substrate is pressed, any of the press electrodes formed on the second insulating substrate makes contact with the first and second sensor electrodes connected to the first and second sensor lines, respectively, thereby providing a predetermined voltage to the No. 1 and No. 2 sensor lines. In this case, even if either the No. 1 or No. 2 sensor line is separated by the first connector, the press electrode makes contact with the first connector, thereby providing the predetermined voltage to the sensor line connected via the first connector. Thus, the touch panel with a built-in display device can identify the pressed position on the second insulating substrate based on the predetermined voltage provided to the No. 1 and No. 2 sensor lines.

BRIEF DESCRIPTION OF THE DRAWINGS

FIG. 15 provides (A) a plan view illustrating an exemplary configuration for preventing reduction in the aperture ratio of a display element portion in a touch panel with a built-in liquid crystal display device, and (B) a cross-sectional view illustrating the display element portion in cross-section taken along line T-T shown in (A).

MODE FOR CARRYING OUT THE INVENTION

1. First Embodiment

<1.1 Configuration of the Touch Panel with Built-In Liquid Crystal Display Device>

Figure 1:
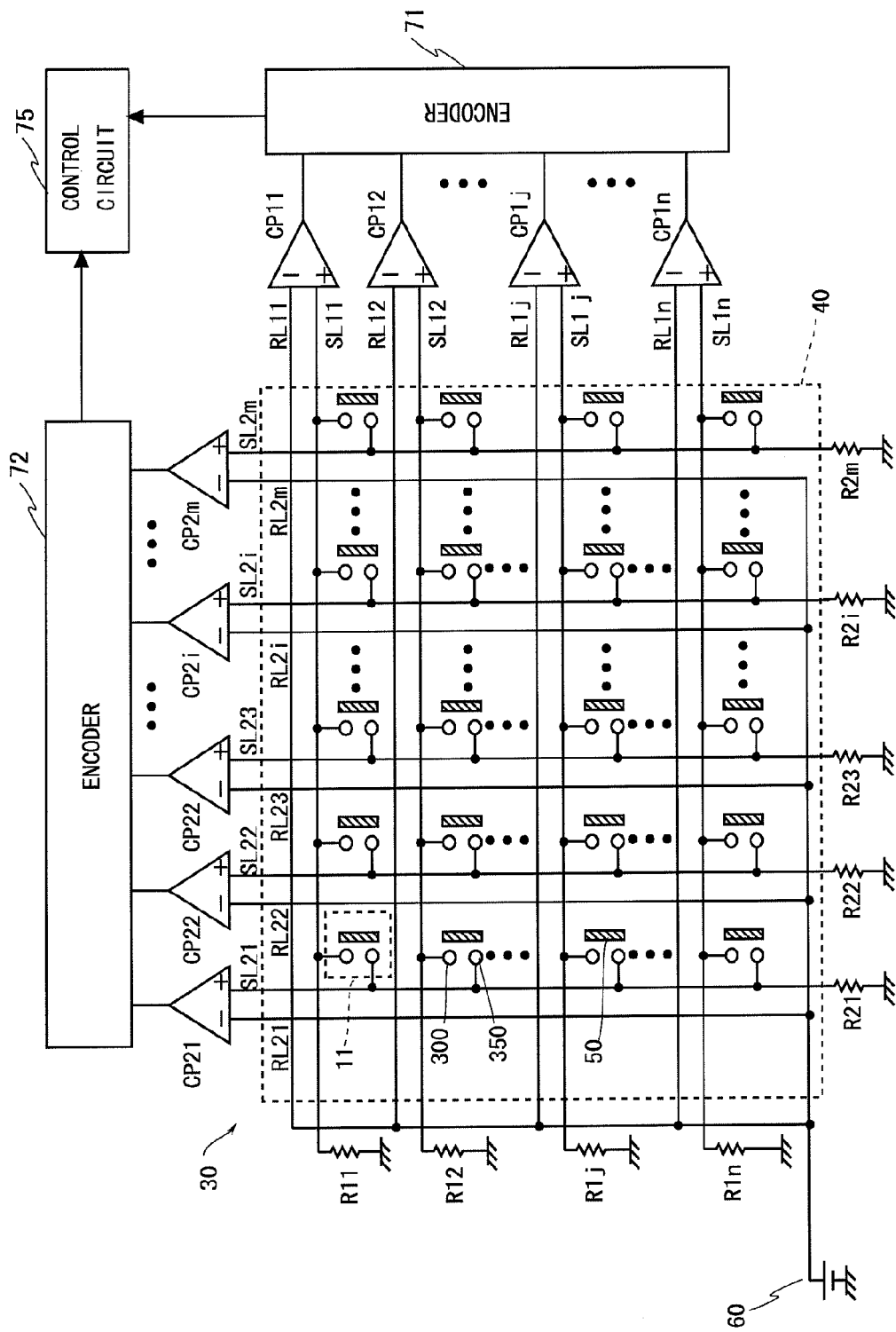
FIG. 1 is a diagram illustrating the configuration of a touch panel with a built-in liquid crystal display device according to a first embodiment of the present invention.
Figure 2:
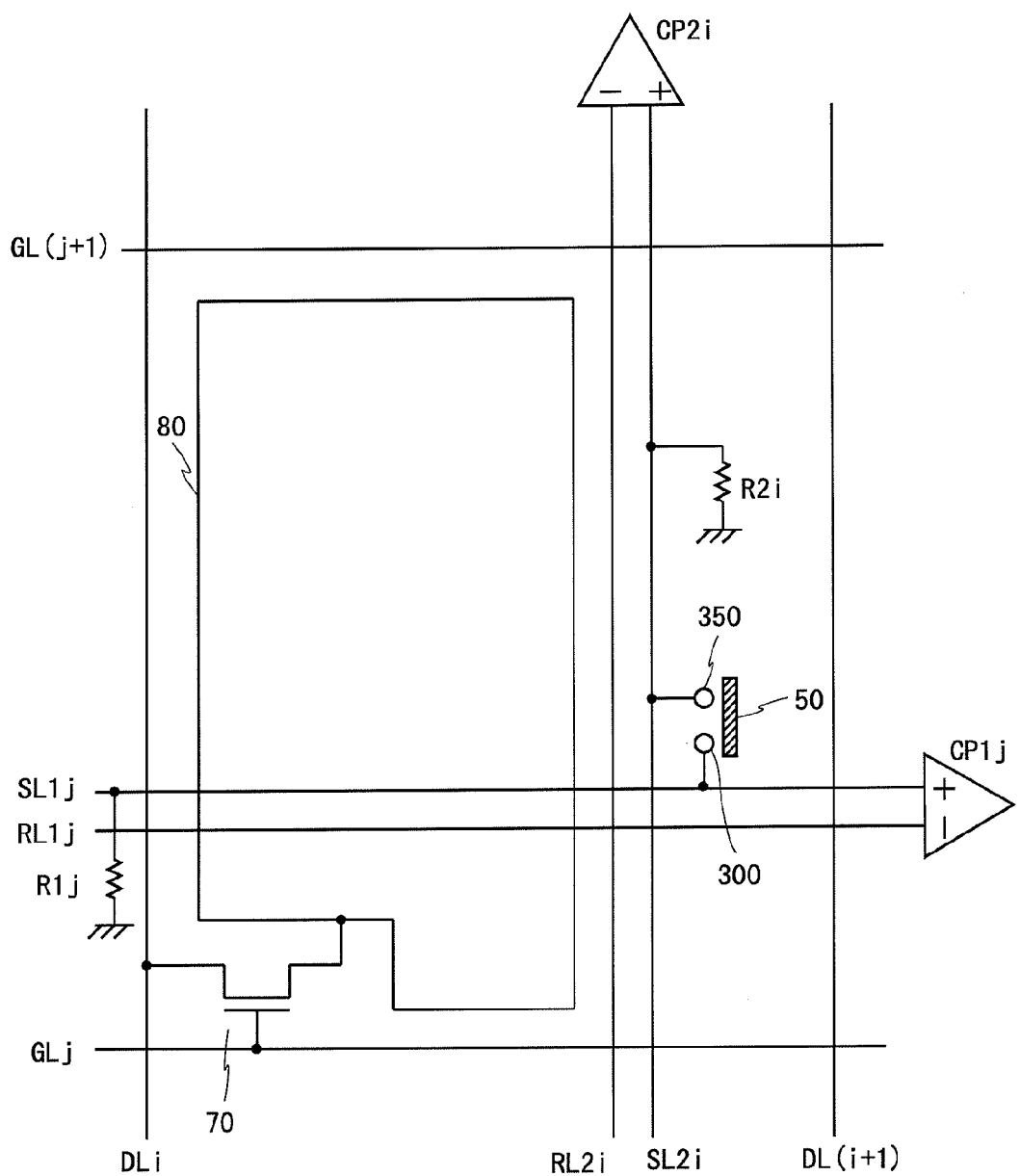
FIG. 2 is a diagram illustrating the configuration of a TFT substrate-side display element portion of the touch panel with a built-in liquid crystal display device shown in FIG. 1.
Figure 3:
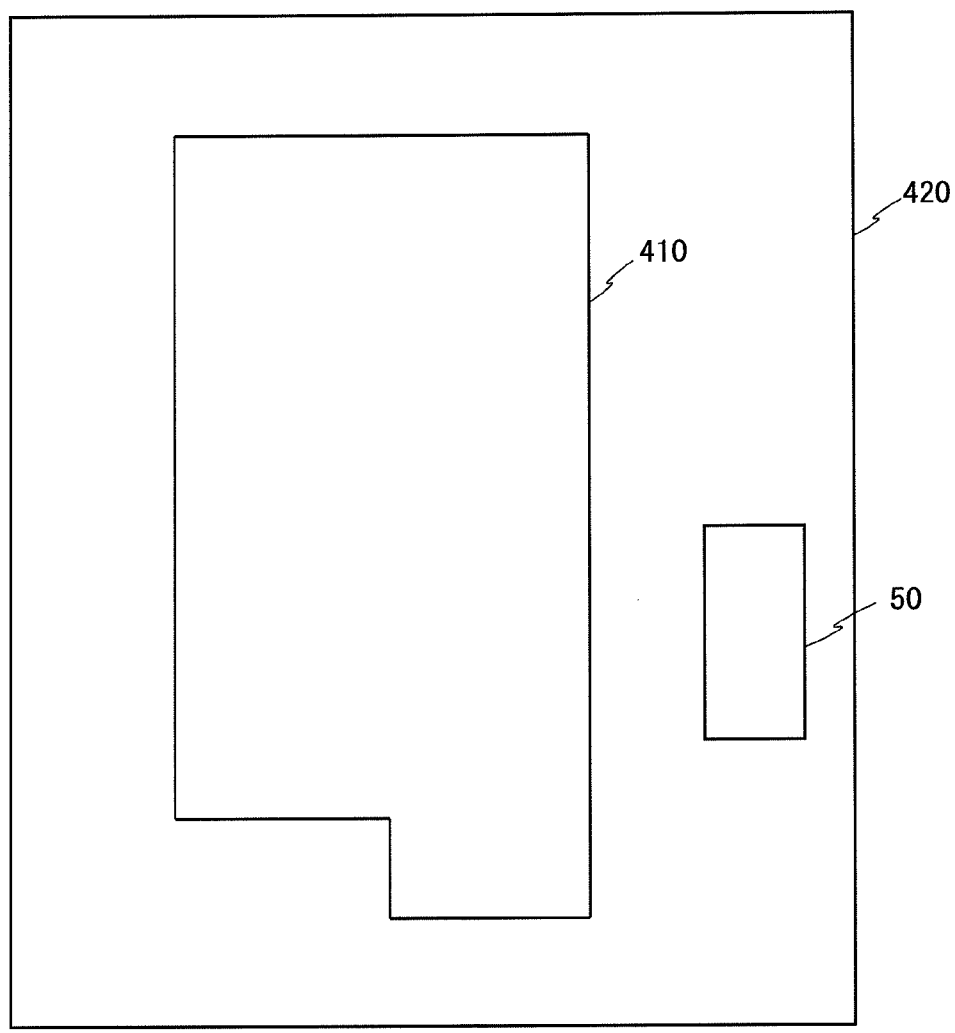
FIG. 3 is a diagram illustrating the configuration of a CF substrate-side display element portion of the touch panel with a built-in liquid crystal display device shown in FIG. 1.

FIG. 1 is a diagram illustrating the configuration of a touch panel with a built-in liquid crystal display device according to a first embodiment of the present invention, FIG. 2 is a diagram illustrating the configuration of a TFT substrate-side display element portion of the touch panel with a built-in liquid crystal display device shown in FIG. 1, and FIG. 3 is a diagram illustrating the configuration of a CF substrate-side display element portion of the touch panel with a built-in liquid crystal display device shown in FIG. 1.

As shown in FIG. 1, the touch panel with a built-in liquid crystal display device includes a TFT substrate 30, which includes a transparent insulating substrate, such as a glass substrate, a quartz substrate, or a plastic substrate, a CF substrate 40 positioned so as to be opposed to the TFT substrate 30, which includes a transparent insulating substrate, and a liquid crystal (not shown) sealed in a space therebetween. Provided on the insulating substrate of the TFT substrate 30 are n (where n is an integer of 1 or more) gate lines $GL_1$ to $GL_n$, n No. 1 sensor lines $SL_{11}$ to $SL_{1n}$, and n No. 1 dummy lines $RL_{11}$ to $RL_{1n}$, all of which extend horizontally, as well as m (where m is an integer of 1 or more) data lines $DL_1$ to $DL_m$, m No. 2 sensor lines $SL_{21}$ to $SL_{2m}$ and m No. 2 dummy lines $RL_{21}$ to $RL_{2m}$, all of which extend vertically. In addition, display element portions 11 are disposed, one for each crossing of the gate lines $GL_1$ to $GL_n$ and the data lines $DL_1$ to $DL_m$. Note that in FIG. 1, the gate lines $GL_1$ to $GL_n$ and the data lines $DL_1$ to $DL_m$ are omitted for clarity. Furthermore, pull-down resistors $R_{11}$ to $R_{1n}$ with high resistance are grounded at one end and connected at the other end to their respective No. 1 sensor lines $SL_{11}$ to $SL_{1n}$. Similarly, pull-down resistors $R_{21}$ to $R_{2m}$ with high resistance are grounded at one end and connected at the other end to their respective No. 2 sensor lines $SL_{21}$ to $SL_{2m}$.

The No. 1 dummy lines $RL_{11}$ to $RL_{1n}$ and the No. 2 dummy lines $RL_{21}$ to $RL_{2m}$ are provided with a predetermined reference voltage from a reference power source 60. Also, n No. 1 comparators $CP_{11}$ to $CP_{1n}$ are provided at the right end of the TFT substrate 30, with the j'th (where j is an integer of from 1 to n) No. 1 comparator $CP_{1j}$ being connected at its positive and negative terminals to the j'th No. 1 sensor line $SL_{1j}$ and the j'th No. 1 dummy line $RL_j$, respectively. Moreover, m No. 2 comparators $CP_{21}$ to $CP_{2m}$ are provided at the upper end of the TFT substrate 30, with the i'th (where i is an integer from 1 to m) No. 2 comparator $CP_{2i}$ being connected at its positive and negative terminals to the i'th No. 2 sensor line $SL_{2i}$ and the i'th No. 2 dummy line $RL_i$, respectively. Furthermore, first sensor electrodes 300 are provided, one for each of m display element portions 11 connected to the j'th No. 1 sensor line $SL_{1j}$, and second sensor electrodes 350 are provided, one for each of n display element portions 11 connected to the i'th No. 2 sensor line $SL_{2i}$. Note that outputs of the No. 1 comparators $CP_{11}$ to $CP_{1n}$ and outputs of the No. 2 comparators $CP_{21}$ to $CP_{2m}$ are connected to a control circuit 75 via first and second encoder circuits 71 and 72, respectively.

Also, as shown in FIG. 2, each display element portion 11 formed on the TFT substrate 30 has a TFT 70 provided therein. The TFT 70 has a gate electrode, a source electrode, and a drain electrode respectively connected to the j'th gate line $GL_j$, the i'th data line $DL_i$, and a pixel electrode 80. When the TFT 70 is turned on, a voltage corresponding to a pixel signal from the data line $DL_i$ is provided to the pixel electrode 80 via the TFT 70.

As shown in FIG. 3, the CF substrate 40 has color filters 410 formed thereon, each filter being red, green, or blue corresponding to an area of the display element portion 11 in which an image is displayed, and black matrices 420 for preventing light leaks are formed so as to surround the color filters 410. Also, each display element portion 11 has a press electrode 50 provided therein. The press electrode 50 is formed above the first sensor electrode 300 and the second sensor electrode 350 and has formed on its surface a common electrode to be supplied with a common voltage. The black matrices 420 are formed so as to cover over the press electrodes 50 as well in order to prevent leakage of backlight. The common electrode is an electrode commonly provided to a plurality of display element portions 11 and disposed on the CF substrate 40 so as to be opposed to the pixel electrodes 80 formed on the TFT substrate 30 with respect to the liquid crystal.

<1.2 Operation of the Touch Panel with Built-in Liquid Crystal Display Device>

Next, the operation of the touch panel with a built-in liquid crystal display device will be described. When the surface of the CF substrate 40 is pressed with a pen or suchlike, the press electrode 50 of the display element portion 11 located at a position on the CF substrate 40 that corresponds to the pressed position is pressed toward the TFT substrate 30, so that the press electrode 50 makes contact with the first sensor electrode 300 and the second sensor electrode 350. As a result, the common voltage is applied to the No. 1 sensor line and the No. 2 sensor line. When the surface of the CF substrate 40 is stopped being pressed, the press electrode 50 returns to its original position, and therefore loses contact with the first sensor electrode 300 and the second sensor electrode 350. Accordingly, the common voltage is stopped being applied to the No. 1 sensor line and the No. 2 sensor line, the potentials of the No. 1 sensor line and the No. 2 sensor line are set to ground via their respective pull-down resistors.

The potentials of the No. 1 and No. 2 sensor lines are provided to the positive terminals of the No. 1 and No. 2 comparators. On the other hand, a reference voltage at a lower level than the common voltage is provided from the reference power source 60 to the negative terminals via the No. 1 and No. 2 dummy lines. The No. 1 and No. 2 comparators compare the potentials provided through the No. 1 and No. 2 sensor lines to the reference voltage provided through the No. 1 and No. 2 dummy lines. The No. 1 and No. 2 sensor lines connected to the display element at which the surface of the CF substrate 40 was pressed are provided with the common voltage. The common voltage is higher than the reference voltage, and therefore the No. 1 and No. 2 comparators output high-level signals. On the other hand, the No. 1 and No. 2 sensor lines connected to display elements at which the surface of the CF substrate 40 was not pressed are set at ground potential because they are grounded via their respective pull-down resistors. Accordingly, the potentials of the No. 1 and No. 2 sensor lines are lower than the reference voltage, and the No. 1 and No. 2 comparators output low-level signals.

When any of the No. 1 comparators $CP_{11}$ to $CP_{1n}$ outputs a high-level signal, the surface of the CF substrate 40 has been pressed at a position (s) corresponding to at least one or more display element portions 11 connected to such a No. 1 comparator. Also, when any of the No. 2 comparators $CP_{21}$ to $CP_{2m}$ outputs a high-level signal, the surface of the CF substrate 40 has been pressed at a position(s) corresponding to at least one or more display element portions 11 connected to such a No. 2 comparator. Outputs from the No. 1 comparators $CP_{11}$ to $CP_{1n}$ are provided to the first encoder circuit 71 to be converted into bit signals, and outputs from the No. 2 comparators $CP_{21}$ to $CP_{2m}$ are provided to the second encoder circuit 72 to be converted into bit signals. The bit signals obtained through the conversion by the first and second encoder circuits 71 and 72 are provided to the control circuit 75, and the control circuit 75 identifies positions at which the CF substrate 40 was pressed, based on the provided bit signals.

<1.3 Configuration of the Display Element Portion>

Figure 4:
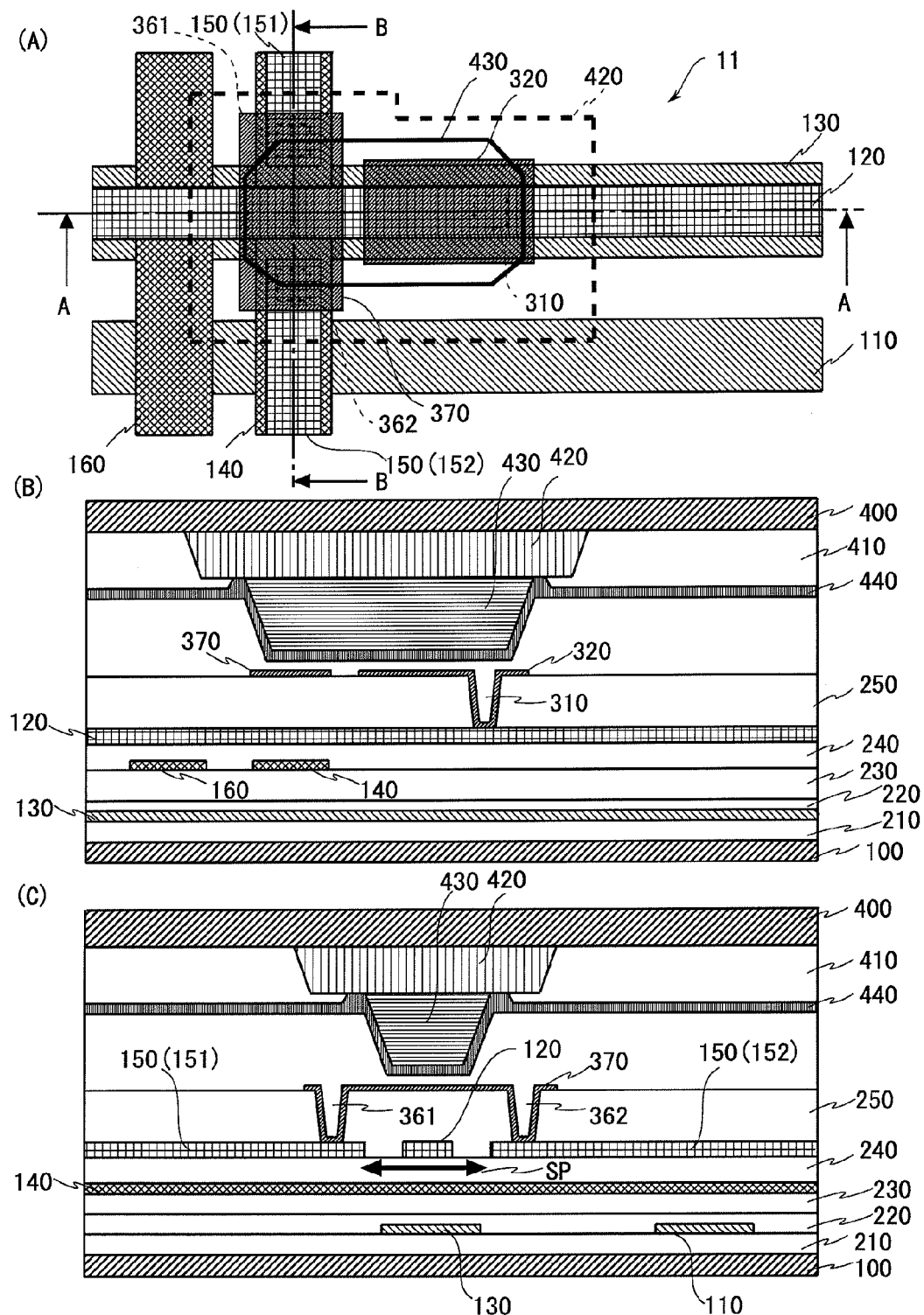
FIG. 4 provides (A) a plan view partially illustrating a display element portion of the touch panel with a built-in liquid crystal display device according to the first embodiment of the present invention, (B) a cross-sectional view illustrating the display element portion in cross-section taken along line A-A shown in (A), and (C) a cross-sectional view illustrating the display element portion in cross-section taken along line B-B shown in (A).

FIG. 4 provides (A) a plan view partially illustrating a display element portion of the touch panel with a built-in liquid crystal display device according to the first embodiment of the present invention, (B) a cross-sectional view illustrating the display element portion in cross-section taken along line A-A shown in (A), and (C) a cross-sectional view illustrating the display element portion in cross-section taken along line B-B shown in (A).

As shown in FIG. 4, in the TFT substrate 30, gate lines 110 and No. 1 dummy lines 130, both of which are made of a first conductive film and extend horizontally, are formed so as to be parallel to each other in the same layer on a base insulating film 210 formed on a transparent insulating substrate 100, such as a glass substrate, a quartz substrate, or a plastic substrate. Note that the base insulating film 210 is made of a silicon-containing insulating film, such as a silicon oxide film or a silicon nitride film, and the first conductive film is made from tantalum, tungsten, tantalum nitride, or an alloy or compound thereof. Alternatively, the first conductive film may be, for example, a laminated conductive film of a three-layer structure in which tantalum nitride, tantalum, and tantalum nitride are sequentially laminated from the bottom or a laminated conductive film having tungsten laminated on the upper surface of the tantalum nitride.

A gate insulating film 220 made of a TEOS film, a silicon oxide film, or the like is formed on the gate lines 110 and the No. 1 dummy lines 130, and an interlayer insulating film 230 made of a silicon oxide film, a silicon nitride film, or the like is formed thereon. Data lines 140 and No. 2 dummy lines 160, both of which are made of a second conductive film and extend vertically, are formed so as to be parallel to each other in the same layer on the interlayer insulating film 230. The second conductive film is made from a low-resistance metal, such as aluminum, titanium, molybdenum, copper, or silver, or an alloy or compound thereof. Alternatively, the second conductive film may be, for example, a laminated conductive film in which titanium, aluminum, and titanium are sequentially laminated from the bottom.

Formed on the data lines 140 and the No. 2 dummy lines 160 is an interlayer insulating film 240 made of a silicon oxide film, a silicon nitride film, a photosensitive acrylic resin or SOG (spin-on-glass) film, or the like. No. 1 sensor lines 120 narrower than the No. 1 dummy lines 130 are disposed at positions on the interlayer insulating film 240 that correspond to the No. 1 dummy lines 130, so as not to stick out beyond the edges of the No. 1 dummy lines 130 when viewed in a plan view. In addition, No. 2 sensor lines 150 narrower than the data lines 140 are disposed at positions on the interlayer insulating film 240 that correspond to the data lines 140, so as not to stick out beyond the edges of the data lines 140 when viewed in a plan view.

The No. 1 sensor lines 120 and the No. 2 sensor lines 150 are both formed of a third conductive film and respectively extend in horizontal and vertical directions. Accordingly, it is necessary to prevent short-circuit where the No. 1 sensor lines 120 cross the No. 2 sensor lines 150. Therefore, each of the No. 1 sensor lines 120 is configured by a single uninterrupted conductor, and each of the No. 2 sensor lines 150 is configured by a pair of conductors 151 and 152 separated by a space SP so as to sandwich the No. 1 sensor line 120 therebetween. Note that each of the No. 1 sensor lines 120 may be configured by a pair of conductors separated by a space, and each of the No. 2 sensor lines 150 may be configured by a single uninterrupted conductor. Moreover, the third conductive film is made of a laminated conductive film of a structure in which, for example, molybdenum is laminated on aluminum, IZO (indium zinc oxide) is laminated on aluminum, or an alloy of molybdenum and niobium is laminated on aluminum.

A protective insulating film 250 made of, for example, a silicon oxide, silicon nitride, photosensitive acrylic resin, or SOG (spin-on-glass) film is formed on the No. 1 and No. 2 sensor lines 120 and 150. Conductive pad portions 320 and 370 are formed in the same layer as pixel electrodes (not shown) on the protective insulating film 250, the layer being made of a fourth conductive film. The pad portions 320 are electrically connected to the No. 1 sensor lines 120 via contact holes 310 to function as the first sensor electrodes 300 shown in FIG. 1. The pad portions 370 are connected to their respective pairs of separated conductors 151 and 152 of the No. 2 sensor lines 150 via pairs of contact holes 361 and 362, and electrically connect the pairs of conductors 151 and 152 on the protective insulating film 250 to function as the second sensor electrodes 350 shown in FIG. 1. Note that the pad portions 370 are also referred to as connectors. Furthermore, the pad portions 320 and the pad portions 370 may also be referred to as first pad portions and second pad portions, respectively.

In this manner, the pad portions 320 and 370 are both formed on the protective insulating film 250, which is the uppermost layer of the TFT substrate 30, and therefore they are equally distanced from the common electrode formed on sensor spacers of the CF substrate 40 which will be described later. Accordingly, when the surface of the CF substrate 40 is pressed, the common electrode formed on the surfaces of the sensor spacers makes simultaneous contact with the pad portions 320 and 370, making it possible for the display element portions 11 to reliably detect pressed positions.

The pad portions 370 also have the function of jumpers. By using the pad portions 370, it becomes possible to electrically connect the pairs of conductors 151 and 152 separated by the spaces SP, and therefore the No. 1 sensor lines 120 and the No. 2 sensor lines 150 can be formed using a conductive film in the same layer. Here, if the No. 1 sensor lines 120 and the No. 2 sensor lines 150 are formed using different layers of conductive film, two layers of conductive film are required. However, when the pad portions 370 are used as jumpers, the No. 1 sensor lines 120 and the No. 2 sensor lines 150 can be formed simply using one layer of conductive film. In this case, the conductive film which is no longer required for use in sensor line formation can be used for some other wiring formation, and therefore the degree of freedom in wiring layout can be increased.

Note that the fourth conductive film is made of a transparent conductive film, such as ITO (indium tin oxide) or IZO, or a reflective film such as aluminum. In addition, to planarize the surface of the protective insulating film 250, the protective insulating film 250 may be formed using two layers of insulating film, with the lower-layer insulating film being a planarized film made of a resin film, such as polyimide, an SOG film, or the like.

Also, in the present embodiment, the No. 1 and No. 2 sensor lines 120 and 150 are both formed by the third conductive film, and therefore the No. 1 and No. 2 sensor lines 120 and 150 are at the same depth from the surface of the protective insulating film 250. Therefore, it is not necessary to provide any relay pads when opening the contact holes 310, 361, and 362, which further increases the aperture ratio of the display element portions 11.

Next, the CF substrate 40 will be described. The red, green, and blue color filters 410 are formed at their respective positions on the insulating substrate 400 that are opposed to the pixel electrodes 80 of the display element portions 11, and each of the color filters 410 has the black matrix 420, which is made from a light-blocking material such as resin, formed so as to surround the color filter. The sensor spacers 430 with a large film thickness, which are made from acrylic resin, are formed at positions corresponding to the pad portions 320 and 370 on the TFT substrate 30. Also, to prevent leakage of backlight, the black matrices 420 are formed so as to extend between the sensor spacers 430 and the insulating substrate 400. The common electrode 440 made of a transparent conductive film, such as ITO or IZO, is formed on the surfaces of the sensor spacers 430 and the color filters 410. As a result, the common electrode 440 is shaped so as to protrude at the positions where the sensor spacers 430 are formed. The sensor spacers 430 having the common electrode 440 formed thereon are also referred to as press electrodes.

In this manner, the TFT substrate 30 and the CF substrate 40 are opposed to each other with respect to the liquid crystal, and the pad portions 320 and 370 are disposed at a predetermined distance from the press electrodes 50. Here, the predetermined distance means such a distance as to allow the common electrode 440 formed on the surfaces of the sensor spacers 430 to make contact with the pad portions 320 and 370 when the surface of the CF electrode 40 is pressed.

Note that to reduce wire cross capacitance at crossings between the gate lines 110 and the data lines 140, the interlayer insulating film 230 is further formed on the gate insulating film 220, but the interlayer insulating film 230 may be omitted when delays of signals provided via the gate lines 110 and the data lines 140 are insignificant. In this case, the manufacturing process of the TFT substrate 30 can be simplified, resulting in reduced manufacturing cost.

Also, when the TFTs 70 formed in the display element portions 11 are of a top-gate type with their channel portions formed of polysilicon, there is a problem in that the characteristics of the TFTs 70 are unstable unless dangling bonds of the polysilicon at interfaces with the gate insulating film 220 are terminated with hydrogen. On the other hand, a high-quality TEOS film is required for use as the gate insulating film 220 for the polysilicon TFTs. However, the TEOS film does not contain hydrogen, and therefore the dangling bonds cannot be terminated. Accordingly, a silicon nitride film produced by plasma CVD is used as the interlayer insulating film 230. In this case, the dangling bonds of the channel portions can be terminated using hydrogen contained in the silicon nitride film, and therefore it is possible to stabilize the characteristics of the polysilicon TFTs.

Also, in the display element portions 11 in the present embodiment, the No. 1 dummy lines 130 and the No. 2 dummy lines 160, which extend in horizontal and vertical directions, respectively, are formed. However, the dummy lines to be formed may be either only the No. 1 dummy lines 130 or the No. 2 dummy lines 160. A method for identifying a position pressed in the direction where no dummy lines are formed in such a case will be described in detail in conjunction with a third embodiment to be described later.

<1.4 Effect>

As described above, in the touch panel with a built-in display device according to the embodiment, each of the No. 1 sensor lines 120 is configured by a single uninterrupted conductor, and each of the No. 2 sensor lines 150 is configured by conductors separated by a space SP, such that the conductor that configures the No. 1 sensor line 120 is sandwiched in the space SP between the separate conductors 151 and 152 that configure the No. 2 sensor line 150. Also, the conductors 151 and 152 separated by the space SP are electrically connected by the pad portion 370. As a result, the No. 1 sensor lines 120 and the No. 2 sensor lines 150 can be formed using a conductive film in the same layer. Accordingly, when compared to the case where the No. 1 sensor lines 120 and the No. 2 sensor lines 150 are formed using different layers of conductive film, it is possible to reduce the number of conductive film layers to be used. In this case, the conductive film which is no longer required for use in sensor line formation can be used for some other wiring formation, and therefore the degree of freedom in wiring layout can be increased.

Also, when the surface of the insulating substrate 400 is pressed, the common electrode 440 formed on the surfaces of the sensor spacers 430 makes contact with the pad portion 370, so that a common voltage is provided to each of the separated conductors 151 and 152 via the pad portion 370. Thus, even when each of the No. 2 sensor lines 150 is formed by the conductors 151 and 152, the display element portions 11 can reliably detect pressed positions.

<1.5 First Variant>

Figure 5:
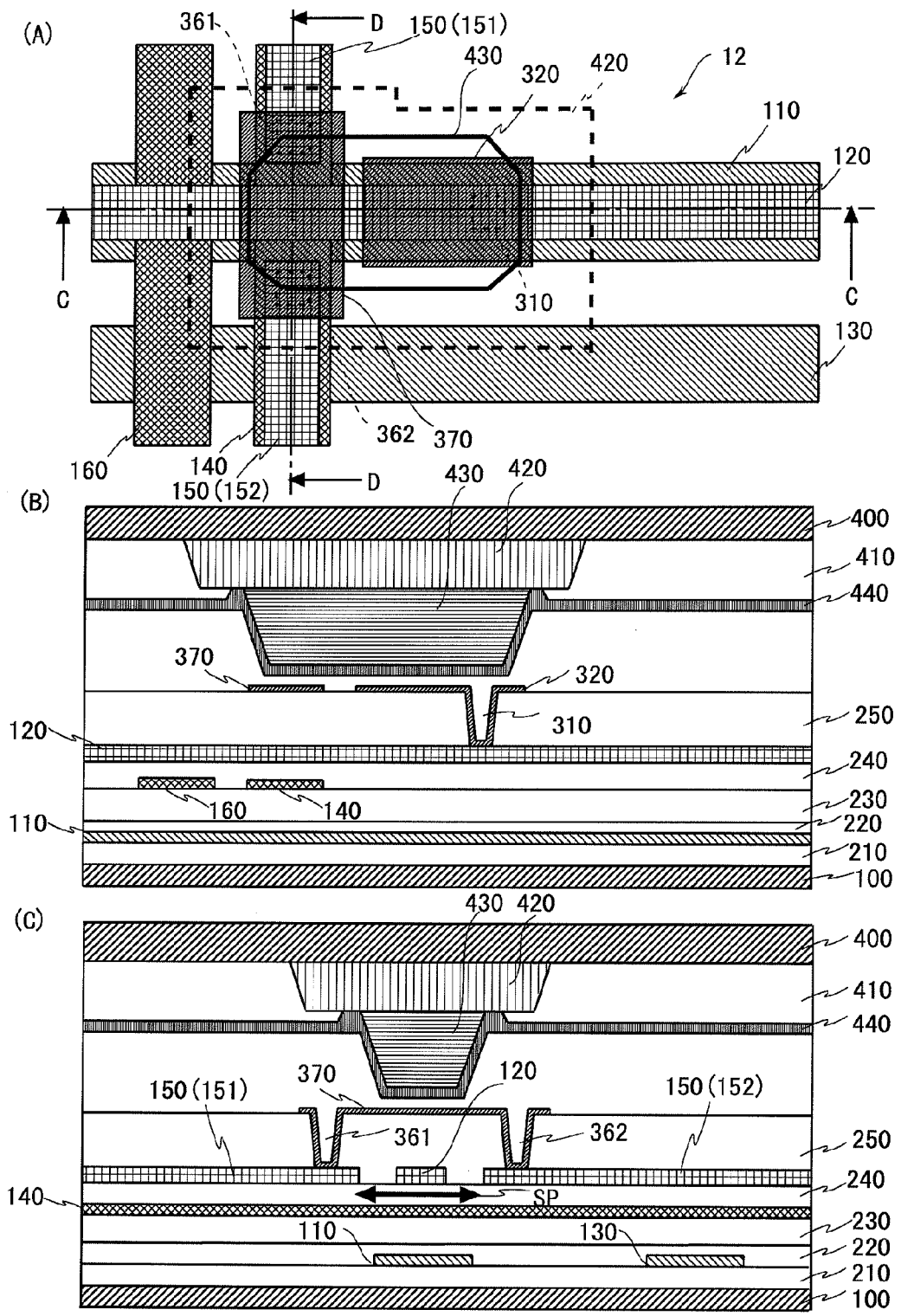
FIG. 5 provides (A) a plan view partially illustrating a display element portion of a touch panel with a built-in liquid crystal display device according to a first variant of the first embodiment, (B) a cross-sectional view illustrating the display element portion in cross-section taken along line C-C shown in (A), and (C) a cross-sectional view illustrating the display element portion in cross-section taken along line D-D shown in (A).

FIG. 5 provides (A) a plan view partially illustrating a display element portion of a touch panel with a built-in liquid crystal display device according to a first variant of the first embodiment, (B) a cross-sectional view illustrating the display element portion in cross-section taken along line C-C shown in (A), and (C) a cross-sectional view illustrating the display element portion in cross-section taken along line D-D shown in (A). Any elements of display element portions 12 as shown in FIG. 5 that are the same as or equivalent to those of the display element portions 11 in the first embodiment as shown in FIG. 4 are denoted by the same reference characters, and mainly differences from the display element portions 11 will be described.

As shown in FIG. 5, in the display element portions 12, the No. 1 dummy lines 130 and the gate lines 110 are switched in their positions compared to the display element portions 11 as shown in FIG. 4. Also, the No. 1 sensor lines 120 are formed by a third conductive film so as to be narrower than the gate lines 110, and are disposed at positions on the interlayer insulating film 240 that correspond to the gate lines 110, so as not to stick out beyond the edges of the gate lines 110 when viewed in a plan view. Consequently, the aperture ratio of the display element portions 12 can be increased.

Also, as in the display element portions 11 as shown in FIG. 4, to prevent short-circuit where the No. 1 sensor lines 120 and the No. 2 sensor lines 150, both of which are formed using the third conductive film, cross each other, each of the No. 1 sensor lines 120 is configured by a single uninterrupted conductor. Also, each of the No. 2 sensor lines 150 is configured by a pair of conductors 151 and 152 separated by a space SP so as to sandwich the No. 1 sensor line 120 therebetween. The pair of separated conductors 151 and 152 are electrically connected by the pad portion 370, and therefore are provided with a common voltage by the pad portion 370 making contact with the press electrode. The effect is similar to that achieved by the touch panel with a built-in liquid crystal display device according to the first embodiment, and therefore any description thereof will be omitted.

<1.6 Second Variant>

Figure 6:
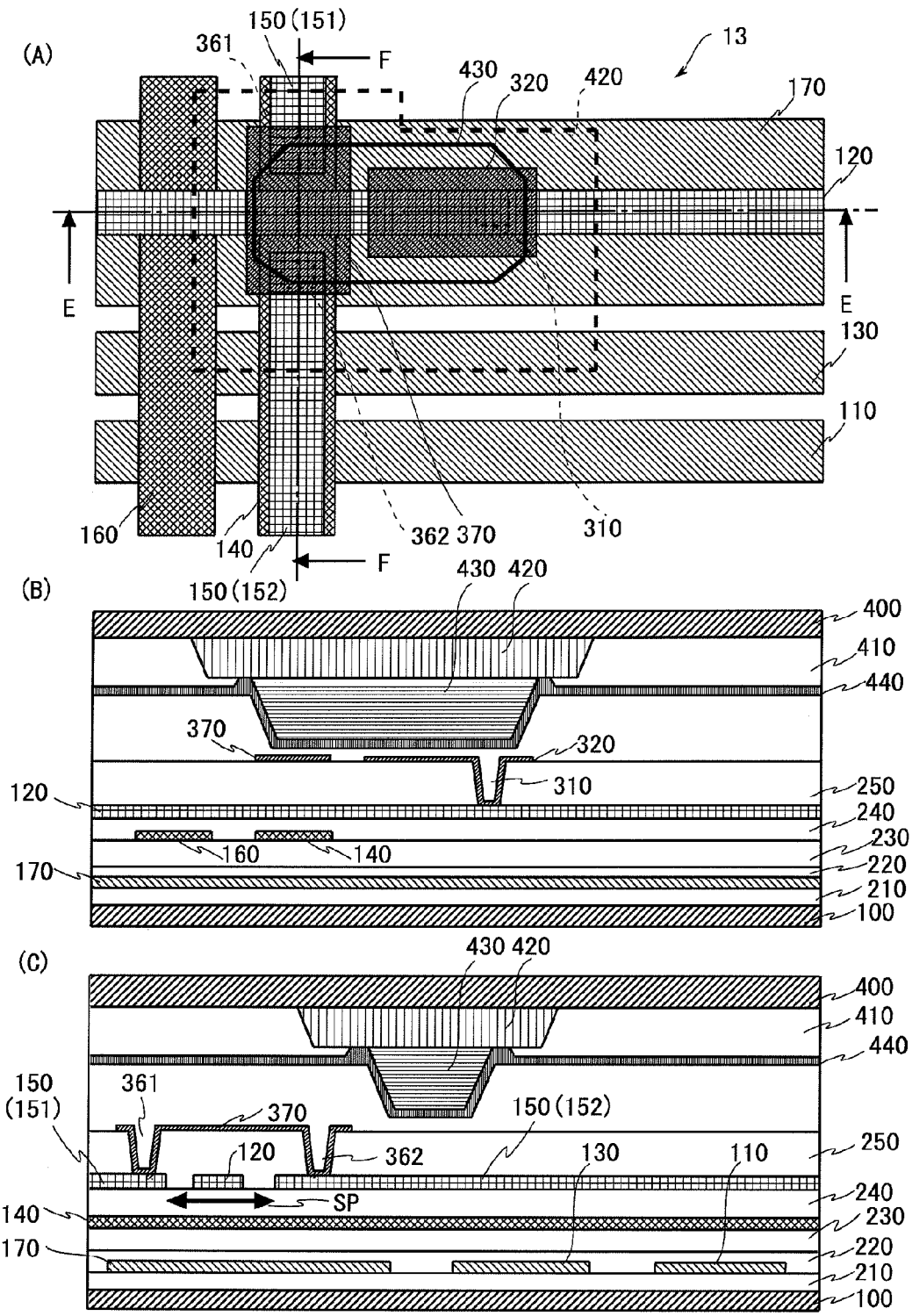
FIG. 6 provides (A) a plan view partially illustrating a display element portion of a touch panel with a built-in liquid crystal display device according to a second variant of the first embodiment, (B) a cross-sectional view illustrating the display element portion in cross-section taken along line E-E shown in (A), and (C) a cross-sectional view illustrating the display element portion in cross-section taken along line F-F shown in (A).

FIG. 6 provides (A) a plan view partially illustrating a display element portion of a touch panel with a built-in liquid crystal display device according to a second variant of the first embodiment, (B) a cross-sectional view illustrating the display element portion in cross-section taken along line E-E shown in (A), and (C) a cross-sectional view illustrating the display element portion in cross-section taken along line F-F shown in (A). Any elements of display element portions 13 as shown in FIG. 6 that are the same as or equivalent to those of the display element portions 11 in the first embodiment as shown in FIG. 4 are denoted by the same reference characters, and mainly differences from the display element portions 11 will be described.

As shown in FIG. 6, in the display element portions 13, unlike in the display element portions 11 as shown in FIG. 4, auxiliary capacitance lines 170, along with the No. 1 dummy lines 130 and the gate lines 110, are formed by a first conductive film on the base insulating film 210, so as to extend horizontally next to the No. 1 dummy lines 130. The auxiliary capacitance lines 170 are wiring conductors connected to auxiliary capacitance electrodes (not shown) provided so as to be opposed to a part of the pixel electrodes, and have a width wider than those of the gate lines 110 and the No. 1 dummy lines 130, such that a larger current flows.

The No. 1 sensor lines 120 are made of a third conductive film and disposed on the interlayer insulating film 240 so as not to stick out beyond the edges of the auxiliary capacitance lines 170 when viewed in a plan view. By forming the No. 1 sensor lines 120 above the auxiliary capacitance lines 170 in this manner, it becomes possible to increase the aperture ratio of the display element portions 13.

As in the display element portions 11 as shown in FIG. 4, it is necessary to prevent short-circuit where the No. 1 sensor lines 120 and the No. 2 sensor lines 150, both of which are formed of the third conductive film, cross each other. Accordingly, each of the No. 1 sensor lines 120 is configured by a single uninterrupted conductor, and each of the No. 2 sensor lines 150 is configured by a pair of conductors 151 and 152 separated by a space SP, so as to sandwich the No. 1 sensor line 120 therebetween. The pair of separated conductors 151 and 152 are electrically connected by the pad portion 370, and therefore are provided with a common voltage by the pad portion 370 making contact with the press electrode. The effect is similar to that achieved by the touch panel with a built-in liquid crystal display device according to the first embodiment, and therefore any description thereof will be omitted. Note that each of the No. 2 sensor lines 150 may be formed by a single conductor, and each of the No. 1 sensor lines 120 may be formed by a pair of separated conductors.

Also, in the display element portions 13, the auxiliary capacitance lines 170 are not wide enough, and therefore the sensor spacers 430 cannot be formed at a sufficient distance from the pixel electrodes. As a result, when the auxiliary capacitance lines 170 are used as black matrices, backlight leaks from the sensor spacers 430, making it difficult to view an image. Thus, it is necessary to provide the black matrices 420 on the sensor spacers 430.

<1.7 Third Variant>

Figure 7:
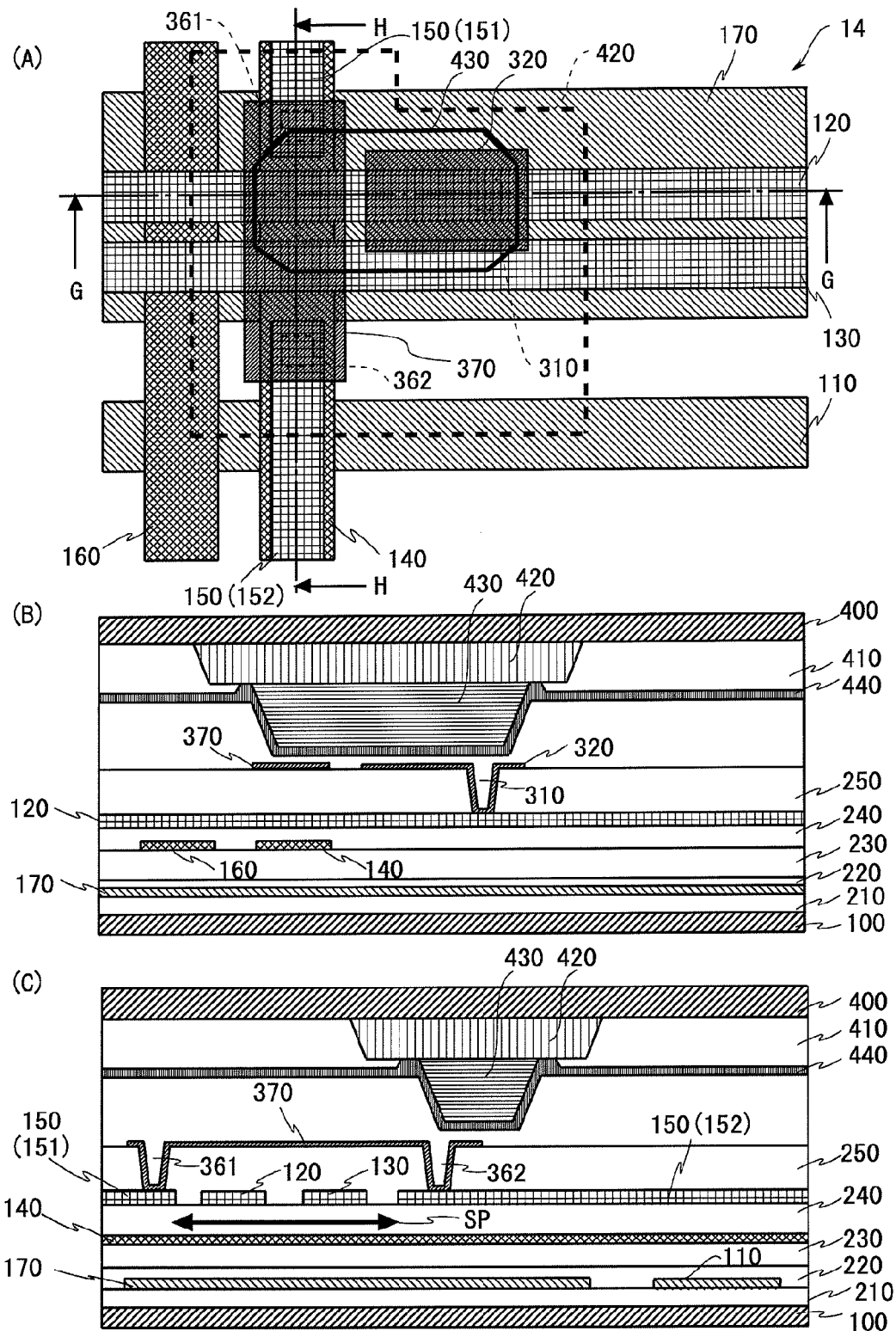
FIG. 7 provides (A) a plan view partially illustrating a display element portion of a touch panel with a built-in liquid crystal display device according to a third variant of the first embodiment, (B) a cross-sectional view illustrating the display element portion in cross-section taken along line G-G shown in (A), and (C) a cross-sectional view illustrating the display element portion in cross-section taken along line H-H shown in (A).

FIG. 7 provides (A) a plan view partially illustrating a display element portion of a touch panel with a built-in liquid crystal display device according to a third variant of the first embodiment, (B) a cross-sectional view illustrating the display element portion in cross-section taken along line G-G shown in (A), and (C) a cross-sectional view illustrating the display element portion in cross-section taken along line H-H shown in (A). Any elements of display element portions 14 as shown in FIG. 7 that are the same as or equivalent to those of the display element portions 13 in the second variant as shown in FIG. 6 are denoted by the same reference characters, and mainly differences from the display element portions 13 will be described.

In the display element portions 13 as shown in FIG. 6, only the No. 1 sensor lines 120 are formed at positions on the interlayer insulating film 240 that correspond to the auxiliary capacitance lines 170. However, in the display element portions 14, the No. 1 dummy lines 130 are also disposed at positions on the interlayer insulating film 240 that correspond to the auxiliary capacitance lines 170, so as not to stick out beyond the edges of the auxiliary capacitance lines 170 when viewed in a plan view, as shown in FIG. 7. Similar to the No. 1 sensor lines 120, the No. 1 dummy lines 130 are formed by the third conductive film so as to be next to and parallel to the No. 1 sensor lines 120.

In this manner, in the touch panel with a built-in liquid crystal display device according to the variant which requires the auxiliary capacitance lines 170, the No. 1 sensor lines 120 and the No. 1 dummy lines 130 are formed above the auxiliary capacitance lines 170, making it possible to further increase the aperture ratio of the display element portions 14.

Also, in addition to the No. 1 sensor lines 120 and the No. 1 dummy lines 130, both of which are formed above the auxiliary capacitance lines 170, the No. 2 sensor lines 150 are also formed by the third conductive film, and therefore it is necessary to prevent short-circuit where the No. 1 sensor lines 120 and the No. 1 dummy lines 130 cross the No. 2 sensor lines 150. Accordingly, each of the No. 1 sensor lines 120 and the No. 1 dummy lines 130 is configured by a single uninterrupted conductor, and each of the No. 2 sensor lines 150 is configured by a pair of conductors 151 and 152 separated by a space SP so as to sandwich the No. 1 sensor line 120 and the No. 1 dummy line 130 therebetween. The pair of separated conductors 151 and 152 are electrically connected by the pad portion 370, and therefore are provided with a common voltage by the pad portion 370 making contact with the press electrode. The effect is similar to that achieved by the touch panel with a built-in liquid crystal display device according to the second variant of the first embodiment, and therefore any description thereof will be omitted. Note that each of the No. 2 sensor lines 150 may be formed by a single conductor, and each of the No. 1 sensor lines 120 and the No. 1 dummy lines 130 may be formed by a pair of separated conductors.

2. Second Embodiment

A touch panel with a built-in liquid crystal display device according to a second embodiment of the present invention and TFT substrate-side display element portions of the touch panel with a built-in liquid crystal display device are identical in configuration to FIGS. 1 and 2 respectively illustrating the configuration of the touch panel with a built-in liquid crystal display device according to the first embodiment and the configuration of the TFT substrate-side display element portion thereof, and therefore any descriptions thereof will be omitted.

<2.1 Configuration of the Display Element Portion>

Figure 8:
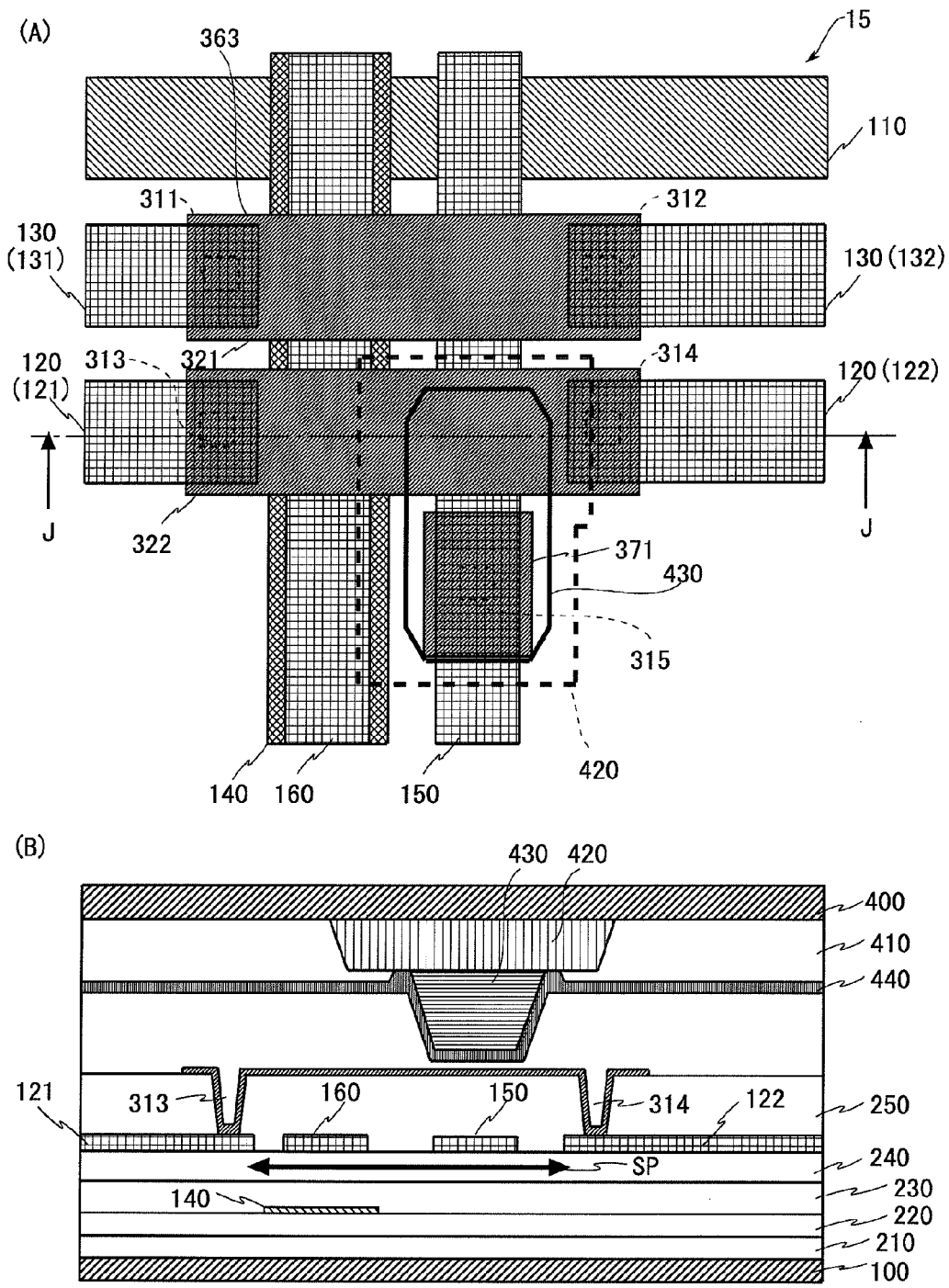
FIG. 8 provides (A) a plan view partially illustrating a display element portion of a touch panel with a built-in liquid crystal display device according to a second embodiment of the present invention, and (B) a cross-sectional view illustrating the display element portion in cross-section taken along line J-J shown in (A).

FIG. 8 provides (A) a plan view partially illustrating a display element portion of the touch panel with a built-in liquid crystal display device according to the second embodiment of the present invention, and (B) a cross-sectional view illustrating the display element portion in cross-section taken along line J-J shown in (A). Any elements of display element portions 15 as shown in FIG. 8 that are the same as or equivalent to those of the display element portions 11 in the first embodiment as shown in FIG. 4 are denoted by the same reference characters, and mainly differences from the display element portions 11 will be described.

As shown in FIG. 8, gate lines 110, which are made of a first conductive film and extend horizontally, are formed on a base insulating film 210, which is formed on an insulating substrate 100. A gate insulating film 220 is formed on the gate lines 110, and data lines 140, which are made of a second conductive film and extend vertically, are formed on the gate insulating film 220.

An interlayer insulating film 230 is formed on the data lines 140, with the interlayer insulating film 240 formed thereon. No. 2 sensor lines 150 and No. 2 dummy lines 160, which are made of a third conductive film and extend vertically, are formed on the interlayer insulating film 240, so as to be parallel to each other. The No. 2 dummy lines 160 are disposed at positions on the interlayer insulating film 240 that correspond to the data lines 140, and are narrower than the data lines 140 so as not to stick out beyond the edges of the data lines 140. Moreover, No. 1 sensor lines 120 and No. 1 dummy lines 130, which extend horizontally, are formed by the third conductive film on the interlayer insulating film 240, so as to be parallel to each other. Both the No. 1 sensor lines 120 and the No. 1 dummy lines 130 are formed so as not to overlap the gate lines 110 when viewed in a plan view.

As described above, the No. 1 sensor lines 120 and the No. 1 dummy lines 130 extend horizontally, the No. 2 sensor lines 150 and the No. 2 dummy lines 160 extend vertically, and furthermore all of them are made of the third conductive film. Accordingly, it is necessary to prevent short-circuit where the No. 1 sensor lines 120 and the No. 1 dummy lines 130 cross the No. 2 sensor lines 150 and the No. 2 dummy lines 160. Therefore, each of the No. 2 sensor lines 150 and the No. 2 dummy lines 160 is configured by a single uninterrupted conductor, and each of the No. 1 sensor lines 120 is configured by a pair of conductors 121 and 122 separated by a space SP so as to sandwich the No. 2 sensor line 150 and the No. 2 dummy line 160 therebetween. Likewise, each of the No. 1 dummy lines 130 is configured by a pair of conductors 131 and 132 separated by a space SP so as to sandwich the No. 2 sensor line 150 and the No. 2 dummy line 160 therebetween.

A protective insulating film 250 is formed on the No. 1 sensor lines 120, the No. 2 sensor lines 150, the No. 1 dummy lines 130, and the No. 2 dummy lines 160. Sets of three pad portions 321, 322, and 371 made of a fourth conductive film, which is the same as the pixel electrodes (not shown), are formed on the protective insulating film 250. The pad portions 321 are electrically connected to their respective pairs of conductors 131 and 132 of the No. 1 dummy lines 130 via contact holes 311 and 312, respectively, and the pad portions 322 are electrically connected to their respective pairs of conductors 121 and 122 of the No. 1 sensor lines 120 via contact holes 313 and 314, respectively. In this manner, the pad portions 321 electrically connect the No. 1 dummy lines 130, each of which consists of its pair of conductors 131 and 132 separated by the space SP, as substantially single conductors on the protective insulating film 250. Moreover, the pad portions 322 electrically connect the No. 1 sensor lines 120, each of which consists of its pair of separated conductors 121 and 122, as substantially single conductors on the protective insulating film 250. Thus, the pad portions 321 and 322 are also referred to as connectors, and have the function of jumpers.

In the touch panel with a built-in liquid crystal display device according to the embodiment, the No. 2 dummy lines 160 of the display element portions 15 are disposed at positions that correspond to the data lines 140, with their width being narrower than the data lines 140 so as not to stick out beyond the edges of the data lines 140, and therefore the aperture ratio of the display element portions 15 can be increased.

Also, both the No. 1 sensor lines 120 and the No. 2 sensor lines 150 are formed by the third conductive film. Consequently, the depth from the surface of the protective insulating film 250 to the No. 1 sensor lines 120 and the depth to the No. 2 sensor lines 150 are equalized, and therefore all of the five types of contact holes 311 to 315 have the same depth. Accordingly, the contact holes 311 to 315 can be made without using any relay pads, making it possible to further increase the aperture ratio of the display element portions 15. Also, the manufacturing process can be simplified compared to the case where the No. 1 sensor lines 120 and the No. 2 sensor lines 150 are formed by their respective different conductive films and so are the No. 1 dummy lines 130 and the No. 2 dummy lines 160.

The pad portions 322 function as the first sensor electrodes 300 as shown in FIG. 1, the pad portions 371 function as the second sensor electrodes 350 as shown in FIG. 1, and both of them are formed on the protective insulating film 250, which is the uppermost layer of a TFT substrate 30. Therefore, the distance from a common electrode 440, which is formed on the surfaces of sensor spacers 430 formed on a CF substrate 40, to the pad portions 322 is equal to the distance from the common electrode 440 to the pad portions 371. Thus, when the surface of the CF substrate 40 is pressed, the common electrode 440 formed on the surfaces of the sensor spacers 430 makes simultaneous contact with the pad portions 322 and 371, making it possible for the display element portions 21 to reliably detect pressed positions.

Using the pad portions 321 and 322 makes it possible to electrically connect both the pairs of conductors 121 and 122 and the pairs of conductors 131 and 132, each pair being separated by a space SP, and therefore the No. 1 sensor lines 120, the No. 1 dummy lines 130, the No. 2 sensor lines 150, and the No. 2 dummy lines 160 can be formed using a conductive film in the same layer. Specifically, instead of using two layers of conductive film to form sets of the No. 1 sensor lines 120 and the No. 1 dummy lines 130, and sets of the No. 2 sensor lines 150 and the No. 2 dummy lines 160, the pad portions 321 and 322 are used as jumpers, making it possible to form such lines using only one layer of conductive film. Accordingly, the conductive film which is no longer required for use can be used for some other wiring formation, thereby increasing the degree of freedom in wiring layout.

Note that each of the No. 1 sensor lines 120 and the No. 1 dummy lines 130 may be formed by a single uninterrupted conductor, and each of the No. 2 sensor lines 150 and the No. 2 dummy lines 160 may be formed by a pair of conductors separated by a space. Moreover, the gate lines 110 and the No. 1 dummy lines 130 may be switched in their positions, so that each of the No. 1 dummy lines 130 may be formed of a single conductor and each of the gate lines 110 may be formed by a pair of conductors separated by a space.

Also, in the display element portions 15 in the present embodiment, the No. 1 dummy lines 130 and the No. 2 dummy lines 160, which extend in horizontal and vertical directions, respectively, are formed. However, the dummy lines to be formed may be either only the No. 1 dummy lines 130 or the No. 2 dummy lines 160. A method for identifying a position pressed in the direction where no dummy lines are formed in such a case will be described in detail in conjunction with the third embodiment to be described later.

<2.2 First Variant>

Figure 9:
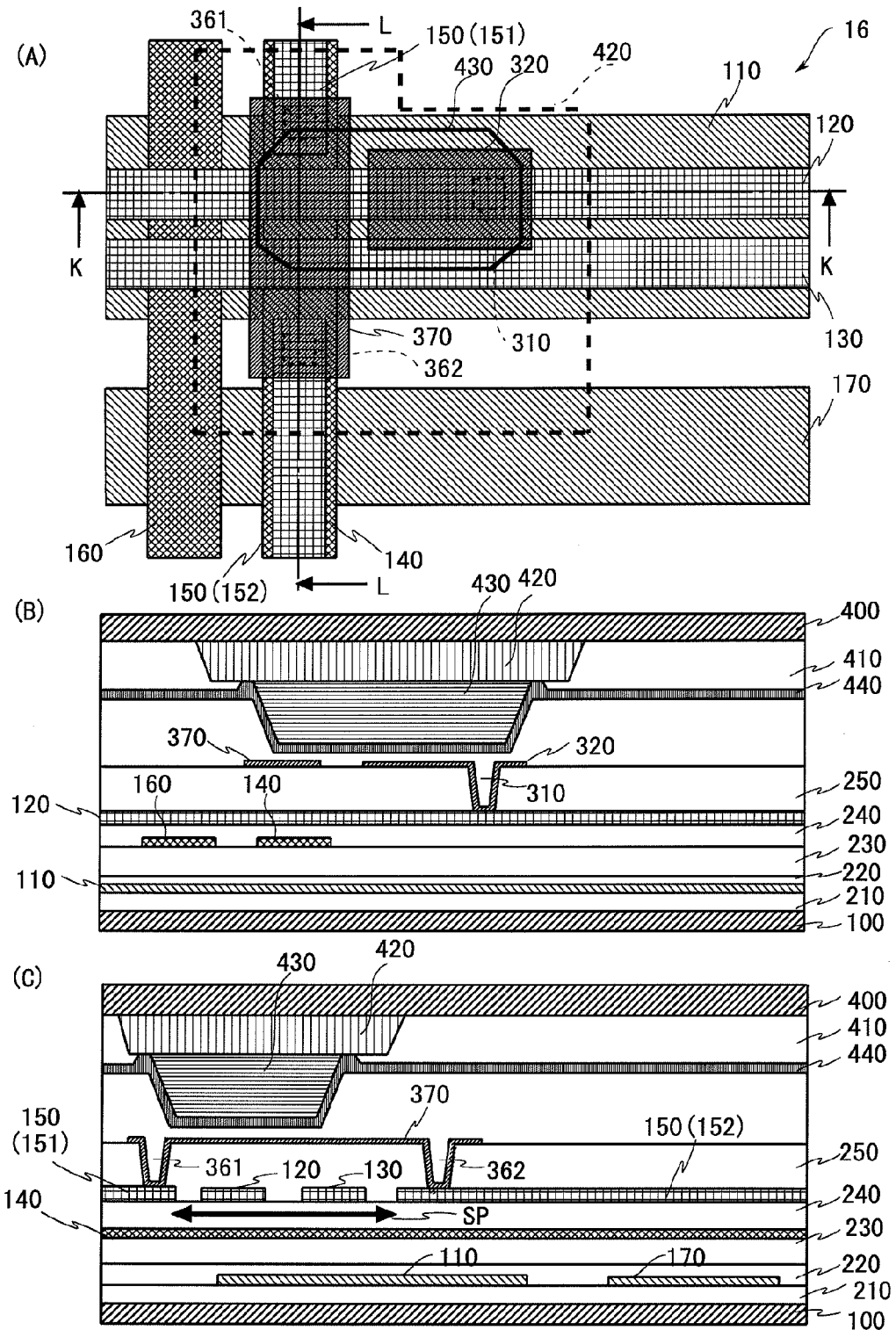
FIG. 9 provides (A) a plan view partially illustrating a display element portion of a touch panel with a built-in liquid crystal display device according to a first variant of the second embodiment, (B) a cross-sectional view illustrating the display element portion in cross-section taken along line K-K shown in (A), and (C) a cross-sectional view illustrating the display element portion in cross-section taken along line L-L shown in (A).

FIG. 9 provides (A) a plan view partially illustrating a display element portion of a touch panel with a built-in liquid crystal display device according to a first variant of the second embodiment, (B) a cross-sectional view illustrating the display element portion in cross-section taken along line K-K shown in (A), and (C) a cross-sectional view illustrating the display element portion in cross-section taken along line L-L shown in (A). Any elements of display element portions 16 as shown in FIG. 9 that are the same as or equivalent to those of the display element portions 14 in the third variant of the first embodiment as shown in FIG. 7 are denoted by the same reference characters, and mainly differences from the display element portions 14 will be described.

In the display element portions 14 as shown in FIG. 7, the No. 1 dummy lines 130, along with the No. 1 sensor lines 120, are disposed at positions on the interlayer insulating film 240 that correspond to the auxiliary capacitance lines 170, so as not to stick out beyond the edges of the auxiliary capacitance lines 170. However, in the display element portions 16, the auxiliary capacitance lines 170 and the gate lines 110 are switched in their positions without any other positional changes, as shown in FIG. 9. Thus, both the No. 1 dummy lines 130 and the No. 1 sensor lines 120 are disposed at positions on the interlayer insulating film 240 that correspond to the gate lines 110, so as not to stick out beyond the edges of the gate lines 110 when viewed in a plan view.

As described above, the No. 1 sensor lines 120 and the No. 1 dummy lines 130 extend horizontally, the No. 2 sensor lines 150 extend vertically, and furthermore all of them are made of the third conductive film. Accordingly, it is necessary to prevent short-circuit where the No. 1 sensor lines 120 and the No. 1 dummy lines 130 cross the No. 2 sensor lines 150. Therefore, each of the No. 1 sensor lines 120 and the No. 1 dummy lines 130 is configured by a single uninterrupted conductor, and each of the No. 2 sensor lines 150 is configured by a pair of conductors 151 and 152 separated by a space SP so as to sandwich the No. 1 sensor line 120 and the No. 1 dummy line 130 therebetween. The pair of separated conductors 151 and 152 are electrically connected by the pad portion 370, and therefore are provided with a common voltage by the pad portion 370 making contact with the press electrode.

The effect achieved by the touch panel with a built-in liquid crystal display device according to the variant is similar to that achieved by the touch panel with a built-in liquid crystal display device according to the third variant of the first embodiment, and therefore any description thereof will be omitted. Note that each of the No. 2 sensor lines 150 may be formed by a single conductor, and each of the No. 1 sensor lines 120 and the No. 1 dummy lines 130 may be formed by a pair of conductors separated by a space.

3. Third Embodiment

<3.1 Configuration and Operation of the Liquid Crystal Touch Panel with a Built-In Display Device>

Figure 10:
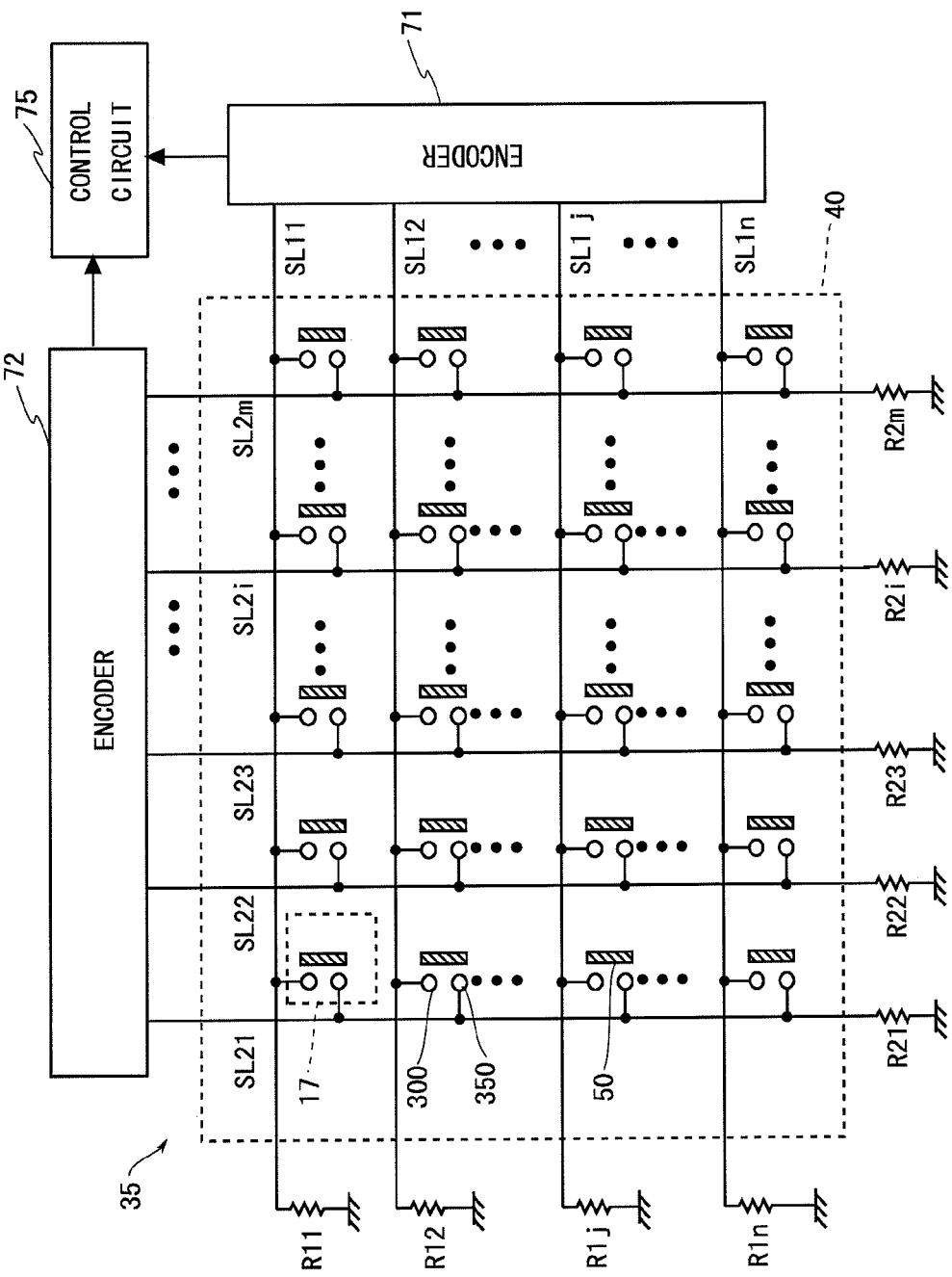
FIG. 10 is a diagram illustrating the configuration of a touch panel with a built-in liquid crystal display device according to a third embodiment of the present invention.
Figure 11:
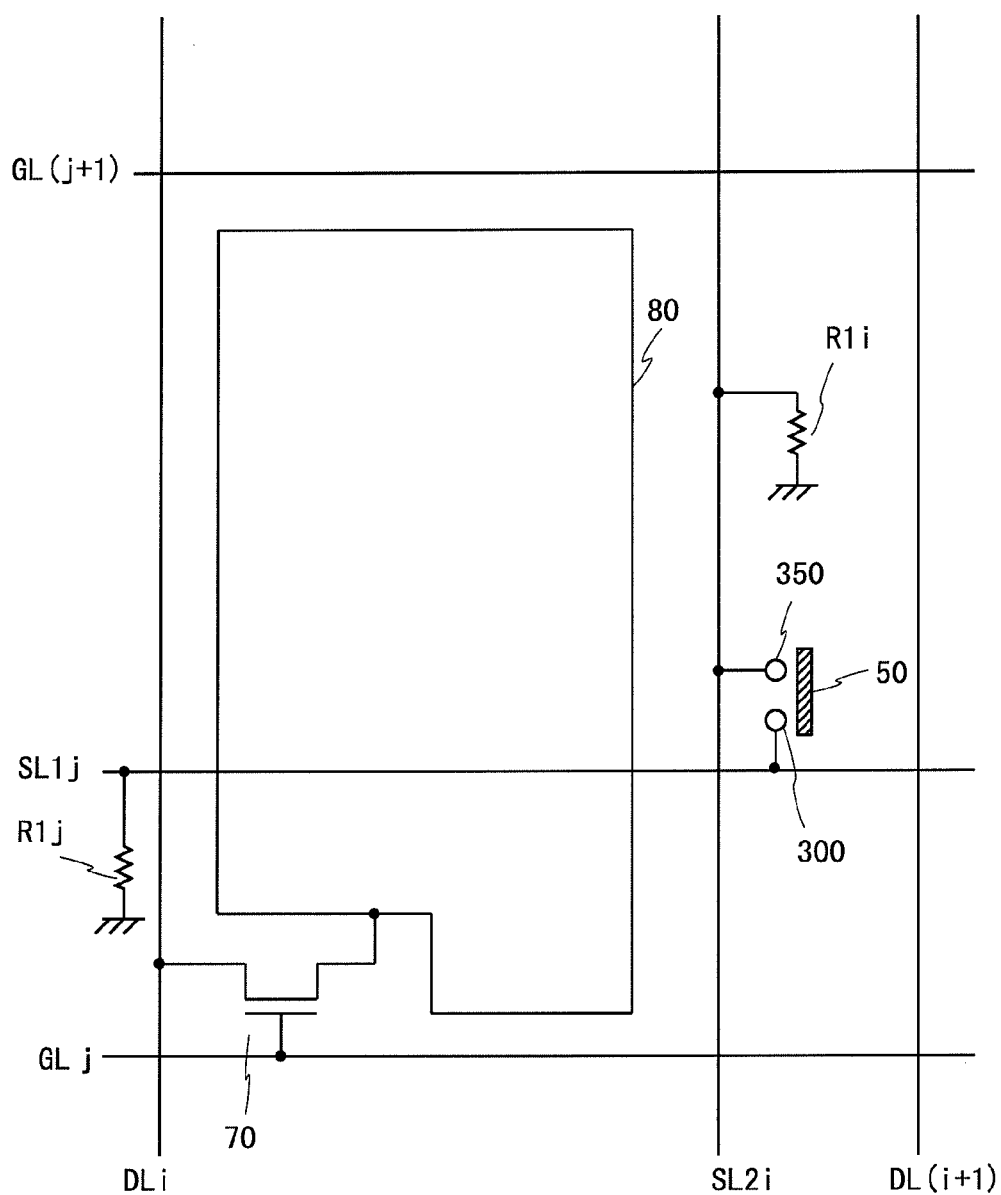
FIG. 11 is a diagram illustrating the configuration of a TFT substrate-side display element portion of the touch panel with a built-in liquid crystal display device shown in FIG. 10.

FIG. 10 is a diagram illustrating the configuration of a touch panel with a built-in liquid crystal display device according to a third embodiment of the present invention, and FIG. 11 is a diagram illustrating the configuration of a TFT substrate-side display element portion of the touch panel with a built-in liquid crystal display device shown in FIG. 10. Any elements of the touch panel with a built-in liquid crystal display device according to the third embodiment that are the same as or equivalent to those of the touch panel with a built-in liquid crystal display device according to the first embodiment and the TFT substrate-side display element portion thereof, shown in FIGS. 1 and 2, are denoted by the same reference characters, and mainly differences therefrom will be described.

A TFT substrate 35 of the touch panel with a built-in liquid crystal display device, unlike the TFT substrate 30 of the touch panel with a built-in liquid crystal display device shown in FIG. 1, are provided with neither No. 1 dummy lines nor No. 2 dummy lines, as shown in FIG. 10. Also, neither No. 1 comparators for comparing potentials of No. 1 sensor lines and No. 1 dummy lines nor No. 2 comparators for comparing potentials of No. 2 sensor lines and No. 2 dummy lines are provided. Accordingly, No. 1 sensor lines $SL_{11}$ to $SL_{1n}$ are connected to a first encoder circuit 71 and No. 2 sensor lines $SL_{21}$ to $SL_{2m}$ are connected to a second encoder circuit 72. Note that in FIG. 10 also, gate lines $GL_1$ to $GL_n$ and data lines $DL_1$ to $DL_m$ are omitted for clarity. Also, a CF substrate 40 is configured in the same manner as the CF substrate 40 in the first embodiment shown in FIG. 3, and therefore any description thereof will be omitted.

As described above, the touch panel with a built-in liquid crystal display device shown in FIG. 10 is not provided with No. 1 dummy lines, No. 2 dummy lines, No. 1 comparators, and No. 2 comparators, and therefore the No. 1 sensor lines $SL_{11}$ to $SL_{1n}$ feed common voltages, which are provided by press electrodes 50, or ground potentials, which are provided via pull-down resistors $R_{11}$ to $R_{1n}$, to the first encoder circuit 71. Also, the No. 2 sensor lines $SL_{21}$ to $SL_{2m}$ feed common voltages, which are provided by the press electrodes 50, or ground potentials, which are provided via pull-down resistors $R_{21}$ to $R_{1m}$, to the second encoder circuit 72. The first encoder circuit 71 generates bit signals based on the common voltages or ground potentials respectively fed by the No. 1 sensor lines $SL_{11}$ to $SL_{1n}$, and provides them to a control circuit 75. Likewise, the second encoder circuit 72 generates bit signals based on the common voltages or ground potentials respectively fed by the No. 2 sensor lines $SL_{21}$ to $SL_{2m}$, and provides them to the control circuit 75. The control circuit 75 identifies pressed positions on the CF substrate 40 based on the provided bit signals.

Also, as shown in FIG. 11, each display element portion 17 has a TFT 70 provided therein. The TFT 70 has a gate electrode, a source electrode, and a drain electrode respectively connected to the j'th gate line $GL_j$, the i'th data line $DL_i$, and a pixel electrode 80. However, unlike in the display element portion 11 shown in FIG. 2, neither No. 1 dummy line nor No. 2 dummy line is provided.

<3.2 Configuration of the Display Element Portion>

Figure 12:
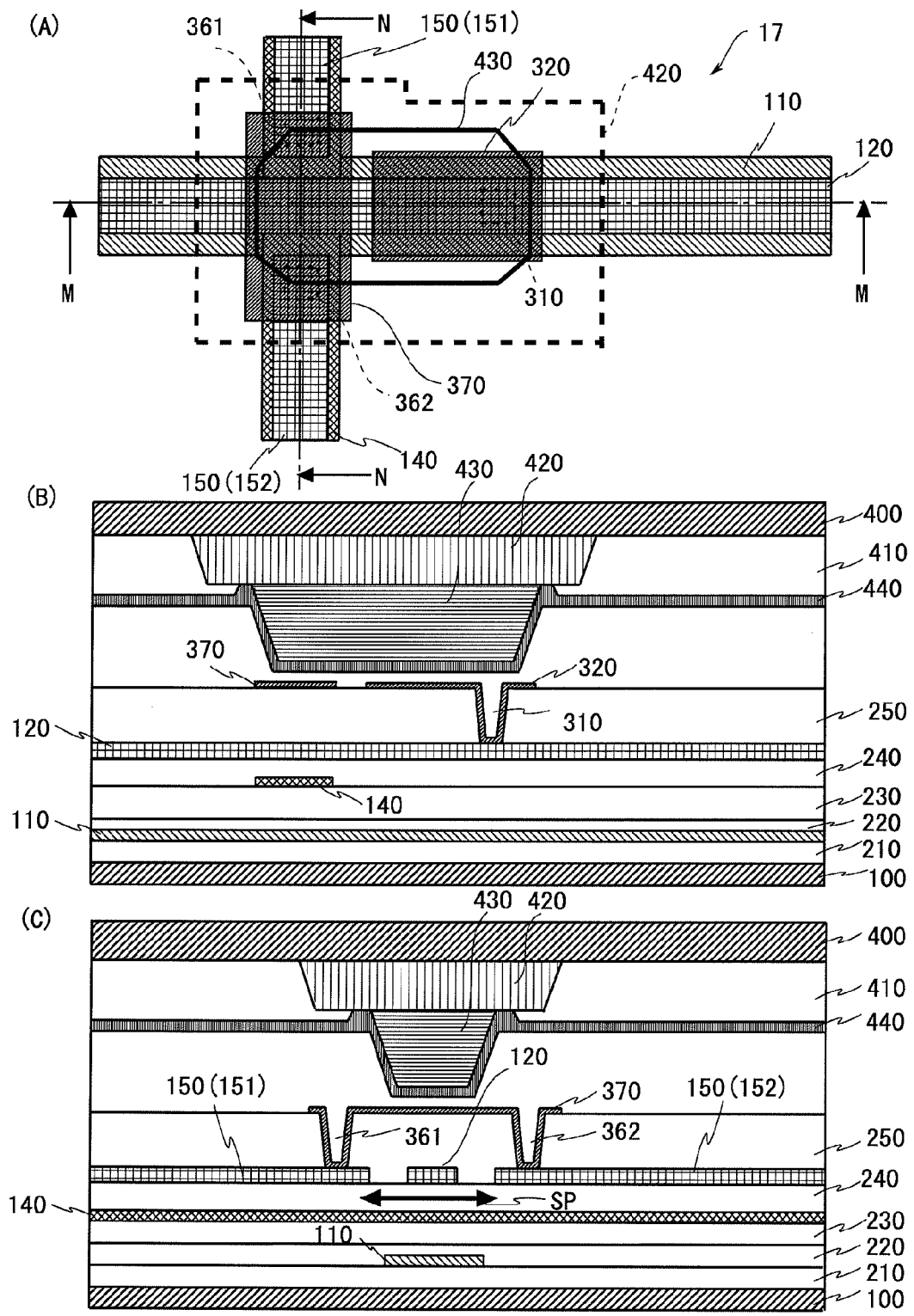
FIG. 12 provides (A) a plan view partially illustrating a display element portion of the touch panel with a built-in liquid crystal display device according to the third embodiment of the present invention, (B) a cross-sectional view illustrating the display element portion in cross-section taken along line M-M shown in (A), and (C) a cross-sectional view illustrating the display element portion in cross-section taken along line N-N shown in (A).

FIG. 12 provides (A) a plan view partially illustrating a display element portion of the touch panel with a built-in liquid crystal display device according to the third embodiment of the present invention, (B) a cross-sectional view illustrating the display element portion in cross-section taken along line M-M shown in (A), and (C) a cross-sectional view illustrating the display element portion in cross-section taken along line N-N shown in (A). Any elements of display element portions 17 as shown in FIG. 12 that are the same as or equivalent to those of the display element portions 12 in the first variant of the first embodiment as shown in FIG. 5 are denoted by the same reference characters, and mainly differences from the display element portions 12 will be described.

As shown in FIG. 12, the display element portions 17 are identical in wiring layout to the display element portions 12 as shown in FIG. 5, except that the No. 1 dummy lines 130 and the No. 2 dummy lines 160 are eliminated, and therefore any description thereof will be omitted. In this manner, the display element portions 17 have neither No. 1 dummy wiring nor No. 2 dummy wiring formed therein, and therefore the touch panel with a built-in liquid crystal display device according to the embodiment makes it possible to increase the aperture ratio correspondingly.

Also, No. 1 sensor lines 120 extend horizontally, No. 2 sensor lines 150 extend vertically, and furthermore both of them are made of a third conductive film. Accordingly, it is necessary to prevent short-circuit where the No. 1 sensor lines 120 and the No. 2 sensor lines 150 cross each other. Therefore, each of the No. 1 sensor lines 120 is configured by a single uninterrupted conductor, and each of the No. 2 sensor lines 150 is configured by a pair of conductors 151 and 152 separated by a space SP so as to sandwich the No. 1 sensor line 120 therebetween. The pair of separated conductors 151 and 152 are electrically connected by a pad portion 370, and therefore are provided with a common voltage by the pad portion 370 making contact with the press electrode. Other effects are the same as those achieved by the touch panel with a built-in liquid crystal display device according to the first variant of the first embodiment, and therefore any descriptions thereof will be omitted. Note that each of the No. 2 sensor lines 150 may be formed by a single interrupted conductor, and each of the No. 1 sensor lines 120 may be formed by a pair of conductors separated by a space.

<3.3 First Variant>

Figure 13:
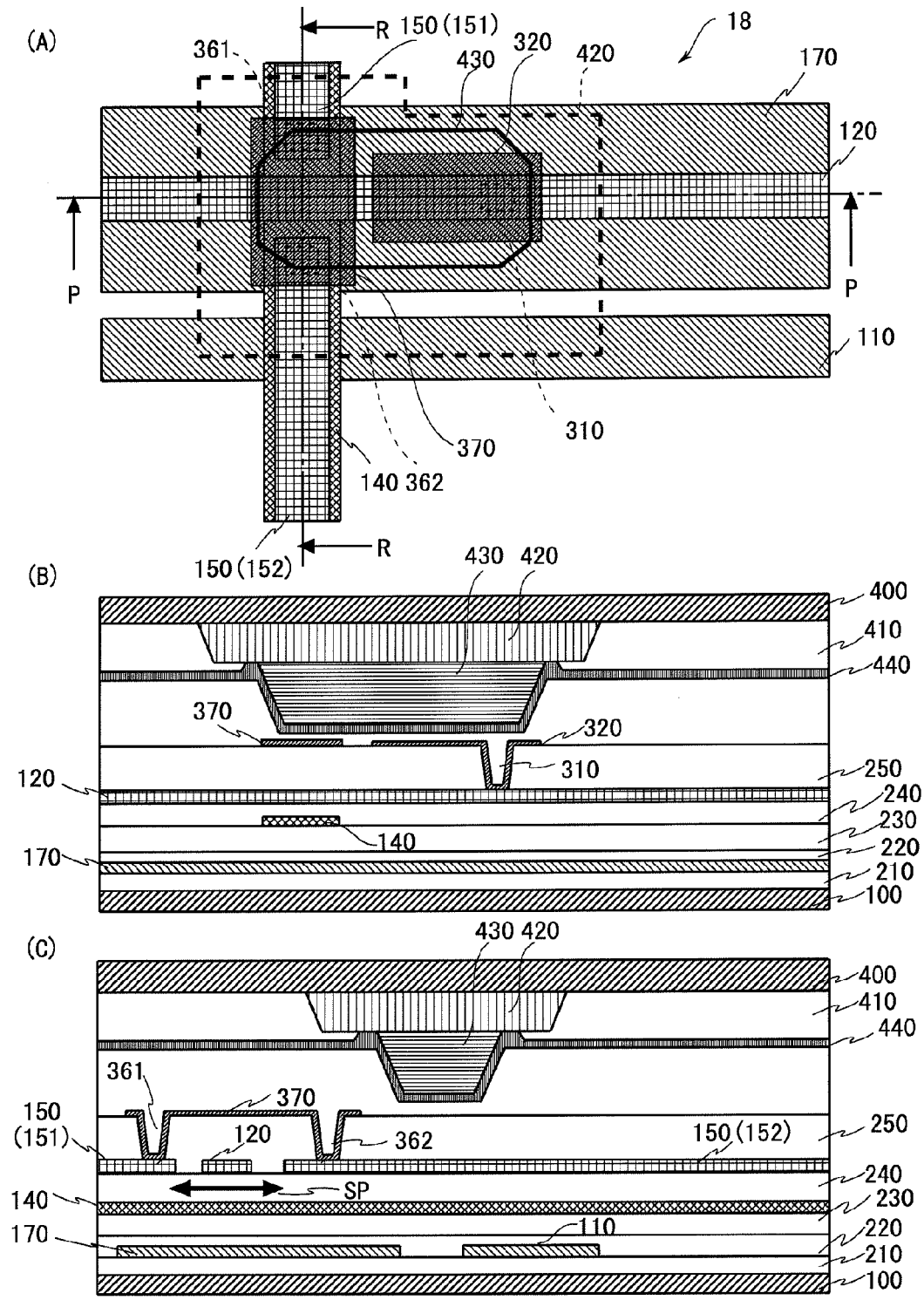
FIG. 13 provides (A) a plan view partially illustrating a display element portion of a touch panel with a built-in liquid crystal display device according to a first variant of the third embodiment of the present invention, (B) a cross-sectional view illustrating the display element portion in cross-section taken along line P-P shown in (A), and (C) a cross-sectional view illustrating the display element portion in cross-section taken along line R-R shown in (A).
Figure 14:
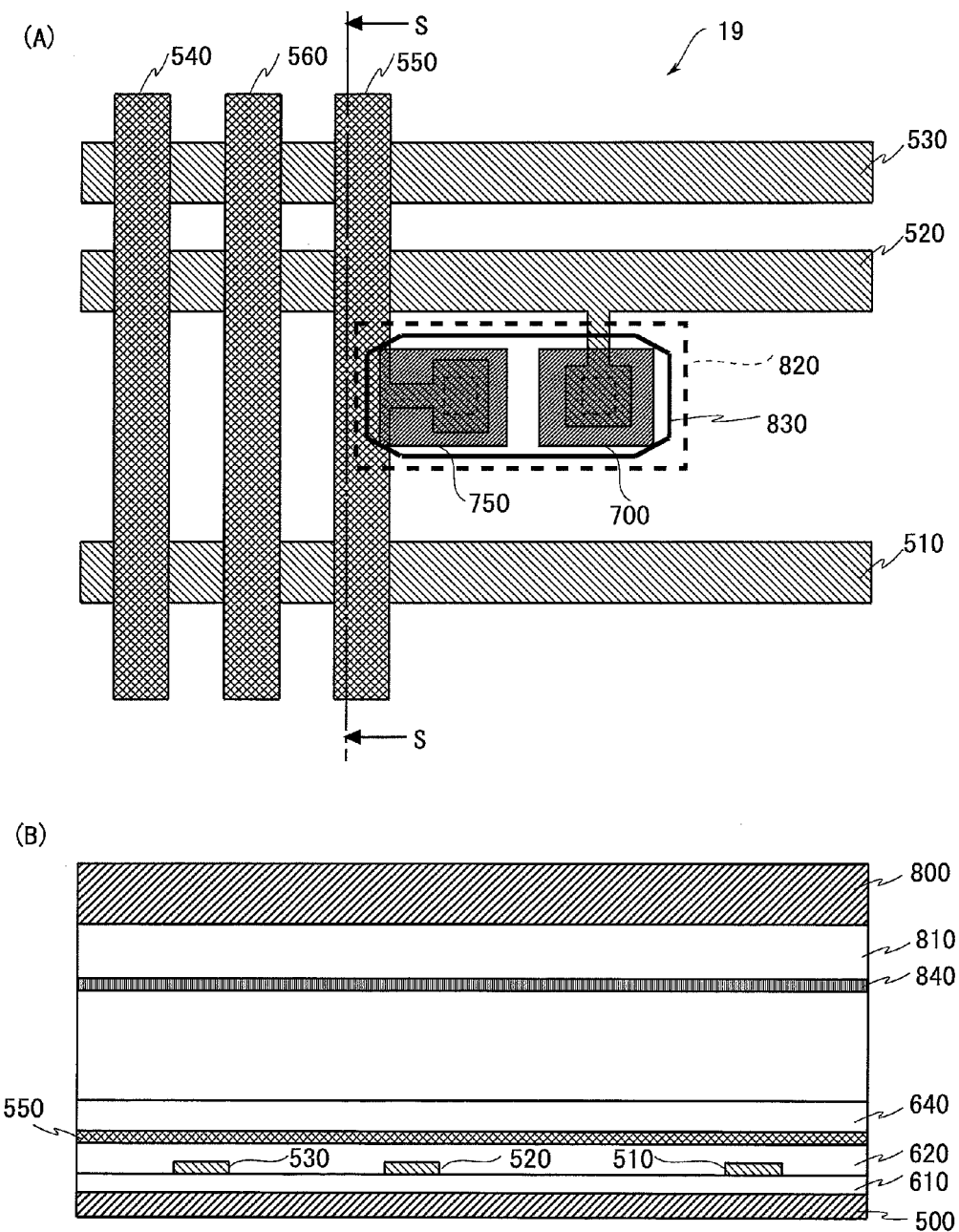
FIG. 14 provides (A) a plan view partially illustrating a display element portion of a conventional touch panel with a built-in liquid crystal display device, and (B) a cross-sectional view illustrating the display element portion in cross-section taken along line S-S shown in (A).

FIG. 13 provides (A) a plan view partially illustrating a display element portion of a touch panel with a built-in liquid crystal display device according to a first variant of the third embodiment of the present invention, (B) a cross-sectional view illustrating the display element portion in cross-section taken along line P-P shown in (A), and (C) a cross-sectional view illustrating the display element portion in cross-section taken along line R-R shown in (A). Any elements of display element portions 18 as shown in FIG. 13 that are the same as or equivalent to those of the display element portions 13 in the second variant of the first embodiment as shown in FIG. 6 are denoted by the same reference characters, and mainly differences from the display element portions 13 will be described.

As shown in FIG. 13, the display element portions 18 are identical in wiring layout to the display element portions 13 as shown in FIG. 6, except that the No. 1 dummy lines 130 and the No. 2 dummy lines 160 are eliminated. In this manner, as with the display element portions 17 as shown in FIG. 12, the display element portions 18 have neither No. 1 dummy wiring nor No. 2 dummy wiring formed therein, and therefore the touch panel with a built-in liquid crystal display device according to the embodiment makes it possible to increase the aperture ratio correspondingly.

Also, as in the case of the third embodiment, the No. 1 sensor lines 120 extend horizontally, the No. 2 sensor lines 150 extend vertically, and furthermore both of them are made of the third conductive film. Accordingly, it is necessary to prevent short-circuit where the No. 1 sensor lines 120 and the No. 2 sensor lines 150 cross each other. Therefore, each of the No. 1 sensor lines 120 is configured by a single uninterrupted conductor, and each of the No. 2 sensor lines 150 is configured by a pair of conductors 151 and 152 separated by a space SP so as to sandwich the No. 1 sensor line 120 therebetween. The pair of separated conductors 151 and 152 are electrically connected by the pad portion 370, and therefore are provided with a common voltage by the pad portion 370 making contact with the press electrode. Other effects are the same as those achieved by the display element portions 13 in the second variant of the first embodiment, and therefore any descriptions thereof will be omitted. Note that each of the No. 2 sensor lines 150 may be formed by a single conductor, and each of the No. 1 sensor lines 120 may be formed by a pair of conductors separated by a space.

INDUSTRIAL APPLICABILITY

The touch panel with a built-in display device of the present invention is used for displays of electronic appliances in which a desired menu selection is made by pressing the panel with a pen or a finger.

DESCRIPTION OF THE REFERENCE CHARACTERS 10 to 20 display element portion
30 TFT substrate
40 CF substrate
50 press electrode
100, 400 insulating substrate
110 gate line
120 No. 1 sensor line
121, 122 conductor
130 No. 1 dummy line
131, 132 conductor
140 data line
150 No. 2 sensor line
151, 152 conductor
160 No. 2 dummy line
170 auxiliary capacitance line
300 first sensor electrode
320, 321, 322, 370, 371 pad portion
350 second sensor electrode
390 first pad electrode
395 second pad electrode
420 black matrix
430 sensor spacer
SP space

The invention claimed is:

1. A touch panel with a built-in display device having a first insulating substrate and a second insulating substrate positioned so as to be opposed to each other and identifying a pressed position based on a predetermined voltage provided when a surface of the second insulating substrate is pressed, the panel comprising:
 a plurality of gate lines and a plurality of No. 1 sensor lines formed on the first insulating substrate so as to extend in a first direction;
 a plurality of data lines and a plurality of No. 2 sensor lines formed on the first insulating substrate so as to extend in a second direction crossing the first direction;
 a plurality of display element portions provided in their respective areas where the gate lines cross the data lines;
 press electrodes formed on the second insulating substrate for providing the predetermined voltage to the No. 1 and No. 2 sensor lines; and
 a position identification circuit for, when the surface of the second insulating substrate is pressed, identifying the pressed position based on the predetermined voltage provided to each of the No. 1 and No. 2 sensor lines connected to the display element portion that corresponds to the pressed position, wherein,
 the No. 1 and No. 2 sensor lines are configured by conductors formed in the same layer,
 the conductors configuring either one group of the No. 1 and No. 2 sensor lines are separated by first spaces,
 the one group of the sensor lines sandwiches the other group of the sensor lines in the first spaces and includes first connectors above the first spaces for electrically connecting the conductors separated by the first spaces, and
 when the surface of the second insulating substrate is pressed, any of the first connectors makes contact with the press electrode to provide the predetermined voltage to each of the conductors separated by the first space.

2. The touch panel with a built-in display device according to claim 1, further comprising a plurality of No. 1 dummy lines and a plurality of No. 2 dummy lines formed on the first insulating substrate, the No. 1 and No. 2 dummy lines having a reference voltage applied thereto and extending in the first direction and the second direction, respectively, wherein,
 the position identification circuit includes a comparison and identification circuit for, when the surface of the second insulating substrate is pressed, comparing the predetermined voltage provided to each of the No. 1 and No. 2 sensor lines to the reference voltage, thereby identifying the pressed position,
 either the No. 1 or No. 2 dummy lines extend in the same direction as at least the other group of the sensor lines and are configured by conductors formed in the same layer as the No. 1 and No. 2 sensor lines, and the one group of the sensor lines further sandwiches the dummy lines extending in the same direction as the other group of the sensor lines in the first spaces.

3. The touch panel with a built-in display device according to claim 1, further comprising a plurality of No. 1 dummy lines and a plurality of No. 2 dummy lines formed on the first insulating substrate, the No. 1 and No. 2 dummy lines having a reference voltage applied thereto and extending in the first direction and the second direction, respectively, wherein,
the position identification circuit includes a comparison and identification circuit for, when the surface of the second insulating substrate is pressed, comparing the predetermined voltage provided to each of the No. 1 and No. 2 sensor lines to the reference voltage, thereby identifying the pressed position,
either the No. 1 or No. 2 dummy lines extend in the same direction as at least the one group of the sensor lines and are configured by conductors formed in the same layer as the No. 1 and No. 2 sensor lines,
the conductors configuring the dummy lines extending in the same direction as the one group of the sensor lines are separated by second spaces, and
the dummy lines extending in the same direction as the one group of the sensor lines sandwich the other group of the sensor lines in the second spaces and include second connectors above the second spaces for electrically connecting the conductors separated by the second spaces.

4. The touch panel with a built-in display device according to claim 3, wherein the one group of the sensor lines and the dummy lines extending in the same direction as the one group of the sensor lines further sandwich the dummy lines extending in the same direction as the other group of the sensor lines in the first spaces and the second spaces, respectively.

5. The touch panel with a built-in display device according to claim 1, wherein,
the display element portions each include:
a first sensor electrode electrically connected to and provided above the No. 1 sensor line; and
a second sensor electrode electrically connected to and provided above the No. 2 sensor line,
the press electrodes are each opposed to the first sensor electrode and the second sensor electrode at a predetermined distance, and make contact with the first and second sensor electrodes to provide the predetermined voltage to both the No. 1 sensor line and the No. 2 sensor line, and
either the first sensor electrode or the second sensor electrode includes the first connector.

6. The touch panel with a built-in display device according to claim 2, wherein,
the display element portions each include:
a first sensor electrode electrically connected to and provided above the No. 1 sensor line; and
a second sensor electrode electrically connected to and provided above the No. 2 sensor line,
the press electrodes are each opposed to the first sensor electrode and the second sensor electrode at a predetermined distance, and make contact with the first and second sensor electrodes to provide the predetermined voltage to both the No. 1 sensor line and the No. 2 sensor line, and
either the first sensor electrode or the second sensor electrode includes the first connector.

7. The touch panel with a built-in display device according to claim 3, wherein,
the display element portions each include:
a first sensor electrode electrically connected to and provided above the No. 1 sensor line; and
a second sensor electrode electrically connected to and provided above the No. 2 sensor line,
the press electrodes are each opposed to the first sensor electrode and the second sensor electrode at a predetermined distance, and make contact with the first and second sensor electrodes to provide the predetermined voltage to both the No. 1 sensor line and the No. 2 sensor line, and
either the first sensor electrode or the second sensor electrode includes the first connector.

8. The touch panel with a built-in display device according to claim 4, wherein,
the display element portions each include:
a first sensor electrode electrically connected to and provided above the No. 1 sensor line; and
a second sensor electrode electrically connected to and provided above the No. 2 sensor line,
the press electrodes are each opposed to the first sensor electrode and the second sensor electrode at a predetermined distance, and make contact with the first and second sensor electrodes to provide the predetermined voltage to both the No. 1 sensor line and the No. 2 sensor line, and
either the first sensor electrode or the second sensor electrode includes the first connector.

* * * * *